(12) United States Patent
Hayashi et al.

(10) Patent No.: US 7,304,934 B2
(45) Date of Patent: Dec. 4, 2007

(54) LENS, OPTICAL HEAD APPARATUS, AND OBJECTIVE LENS FOR THE OPTICAL HEAD APPARATUS

(75) Inventors: Kenichi Hayashi, Nagano (JP); Yuji Fujita, Nagano (JP); Yoshifusa Miyasaka, Nagano (JP); Tetsuro Okamura, Chino (JP)

(73) Assignee: Nidec Sankyo Corporation, Nagano (JP)

( * ) Notice: Subject to any disclaimer, the term of this patent is extended or adjusted under 35 U.S.C. 154(b) by 657 days.

(21) Appl. No.: 10/833,680

(22) Filed: Apr. 28, 2004

(65) Prior Publication Data

US 2005/0002315 A1    Jan. 6, 2005

(30) Foreign Application Priority Data

Apr. 28, 2003 (JP) ............................. 2003-123892
Apr. 30, 2003 (JP) ............................. 2003-125719
Jul. 28, 2003 (JP) ............................. 2003-202610

(51) Int. Cl.
*G11B 7/00* (2006.01)

(52) U.S. Cl. ............................. 369/112.08; 369/122.23

(58) Field of Classification Search ........... 369/112.08, 369/112.23
See application file for complete search history.

(56) References Cited

U.S. PATENT DOCUMENTS

| | | | | |
|---|---|---|---|---|
| 4,983,017 A | * | 1/1991 | Tsuji et al. | ................. 359/566 |
| 6,091,544 A | * | 7/2000 | Hasegawa et al. | .......... 359/566 |
| 2002/0141319 A1 | * | 10/2002 | Matsumura et al. | ... 369/112.05 |
| 2005/0008889 A1 | * | 1/2005 | Hayashi et al. | ............. 428/596 |

FOREIGN PATENT DOCUMENTS

| | | |
|---|---|---|
| JP | 09-12027 | 5/1997 |
| JP | 2000-081566 | 3/2000 |

* cited by examiner

*Primary Examiner*—Wayne Young
*Assistant Examiner*—Van T. Pham
(74) *Attorney, Agent, or Firm*—Reed Smith LLP

(57) ABSTRACT

A common objective lens typically used in reading data from different optical data storage media that are responsive to laser beams of different wavelengths, such as CD and DVD is provided. The lens has a refracting surface with inner and outer refracting surface regions. Diffraction gratings are provided in both the inner and outer refracting surface regions with each having a differential optical path function. The inner diffraction grating and at least a part of the outer diffraction grating emit an order of diffracted beams which have different polarities to cancel out any spherical aberrations caused by a change in temperature.

12 Claims, 15 Drawing Sheets

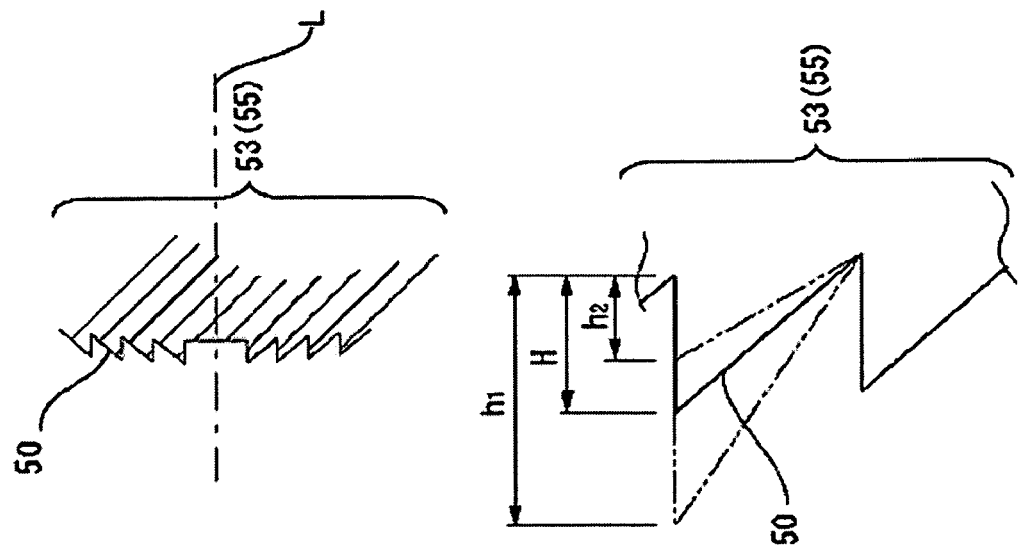
Fig. 5-(a)
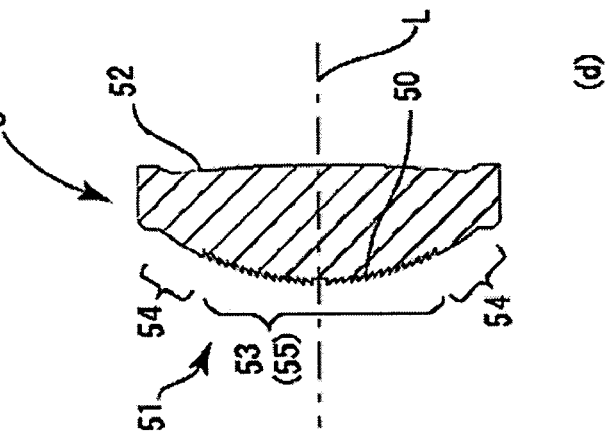
Fig. 5-(b)
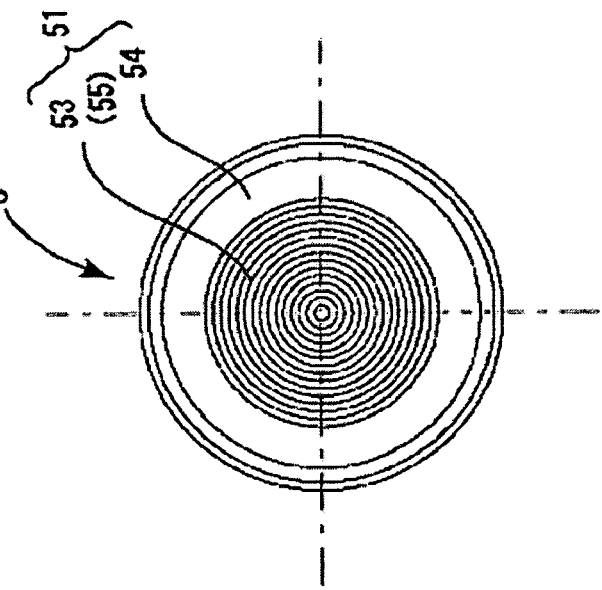
Fig. 5-(c)
(d)

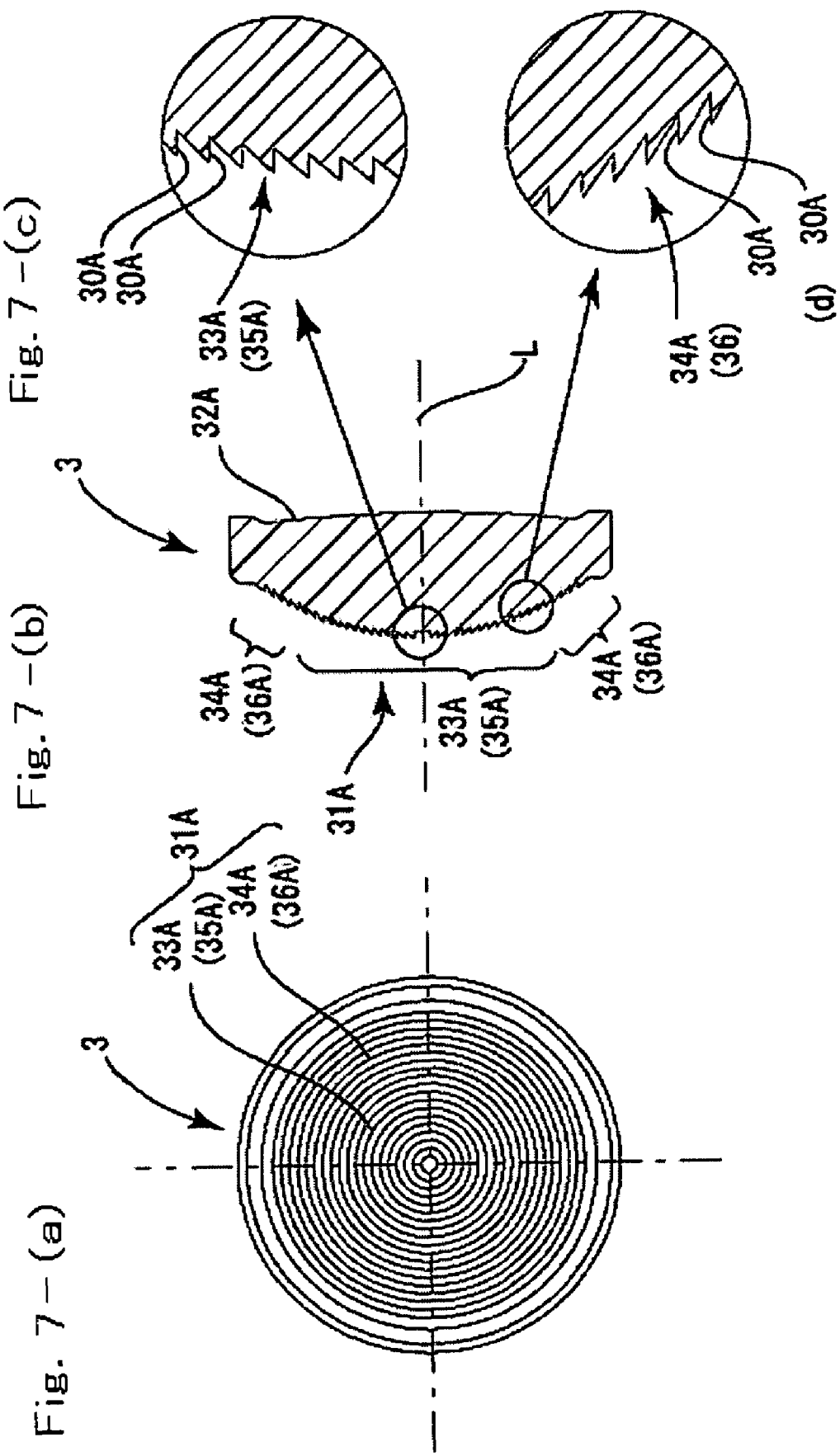

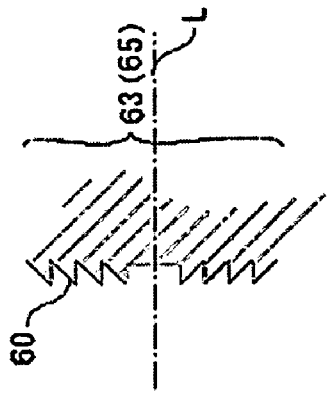
Fig.8-(a)
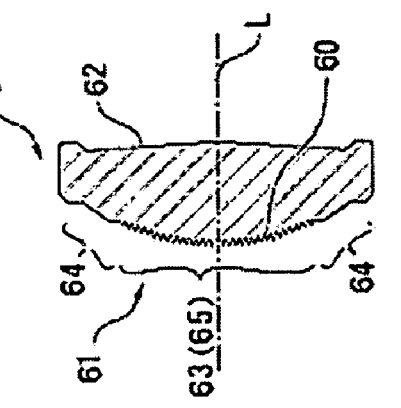
Fig.8-(b)
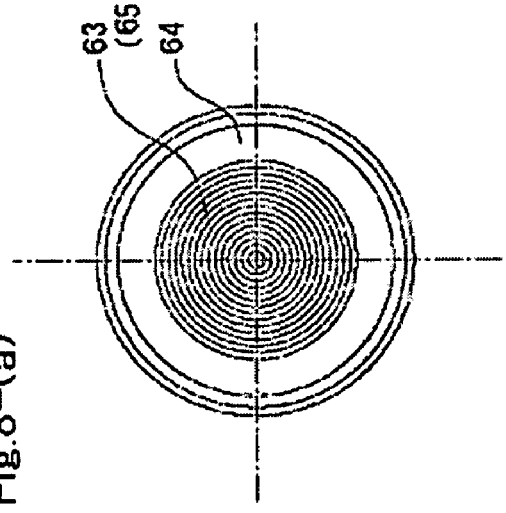
Fig.8-(c)
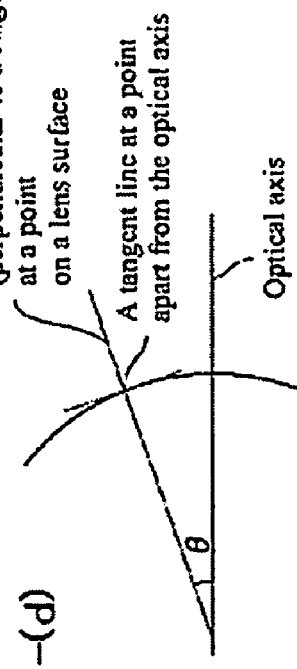
Fig.8-(d)

Fig.10-(a)
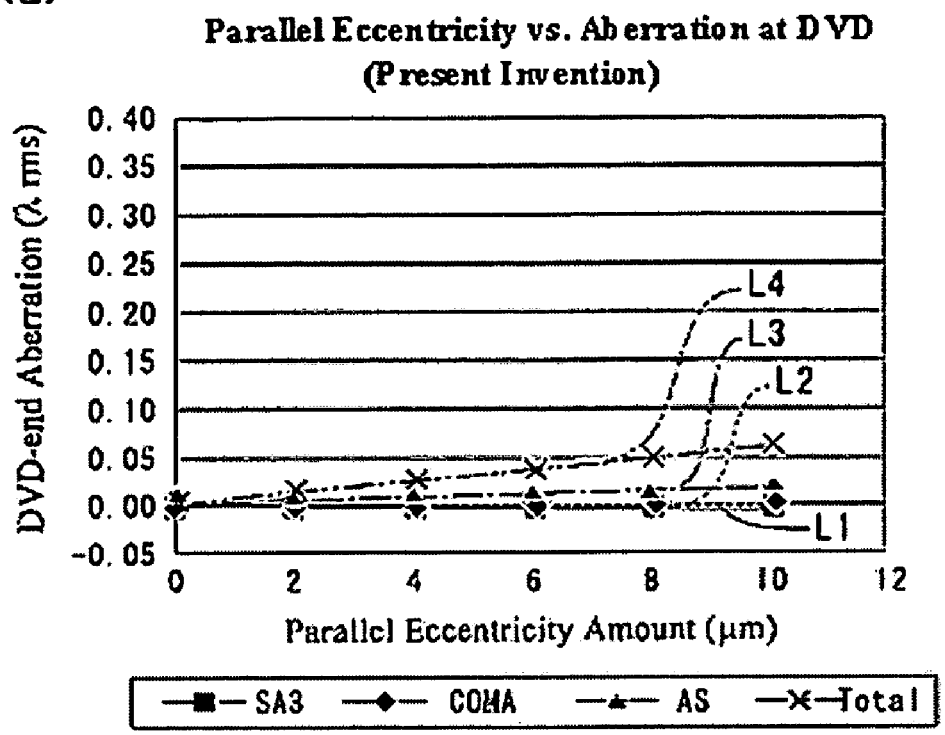
Fig.10-(b)
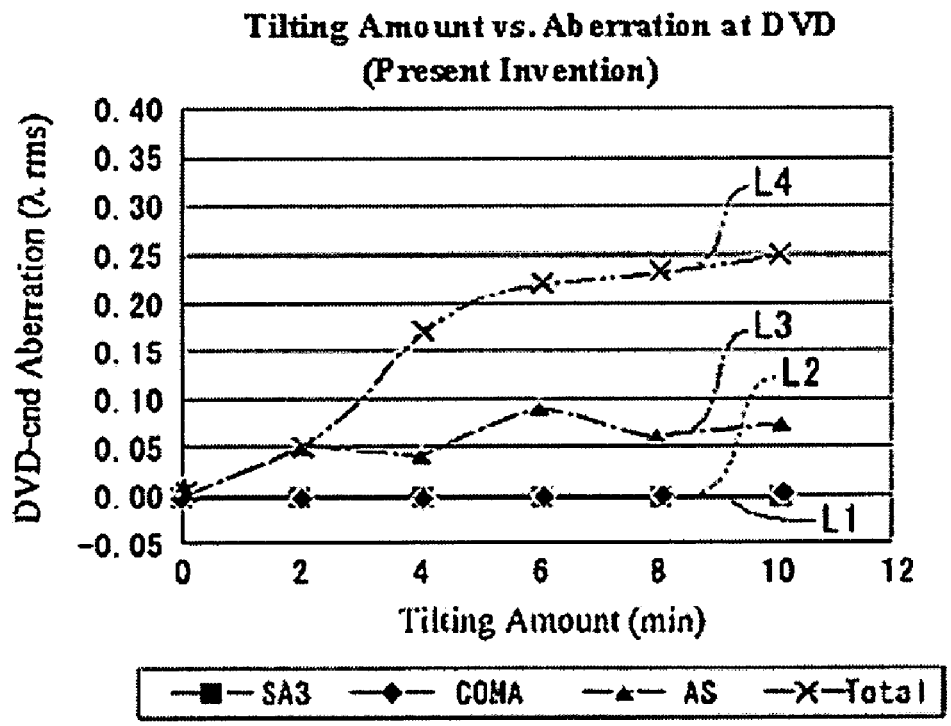

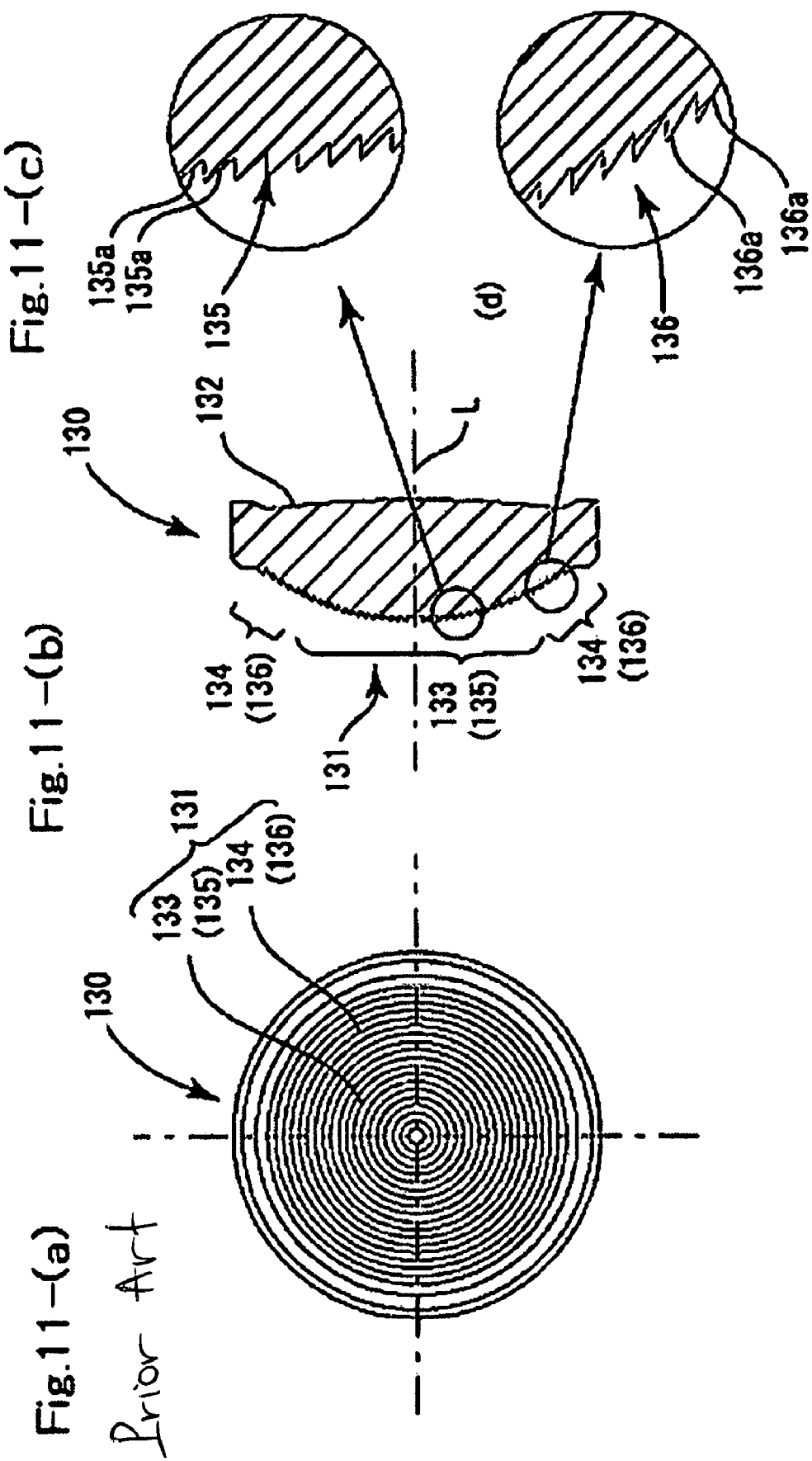

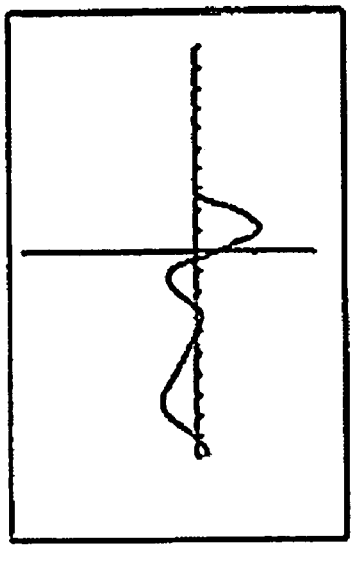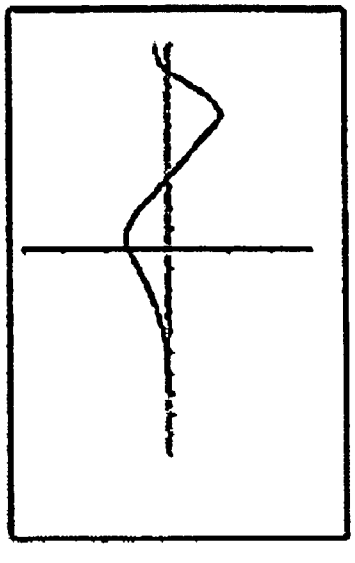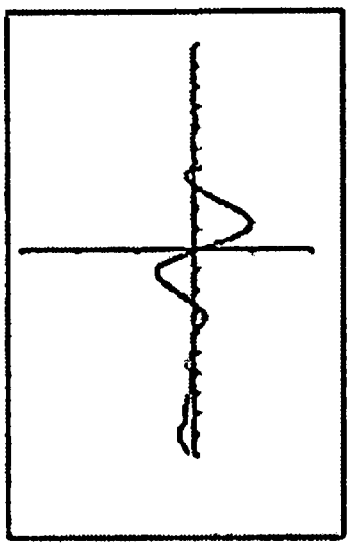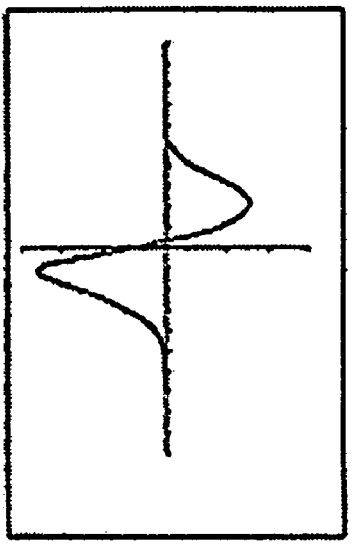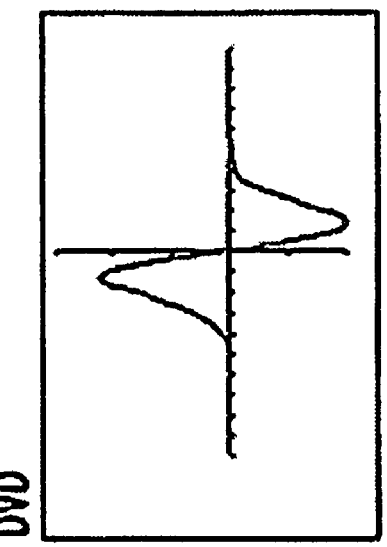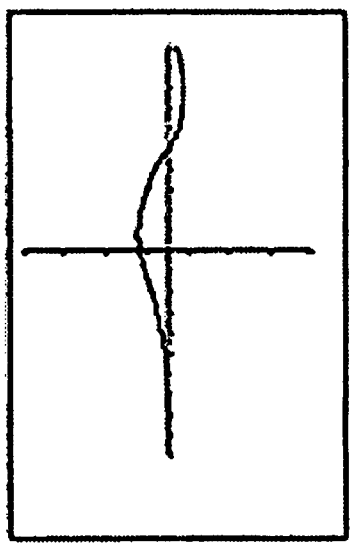
Fig.14-(c) DVD / CD
Fig.14-(b) DVD / CD
Fig.14-(a) Prior Art DVD / CD Fig.15-(a) Prior Art
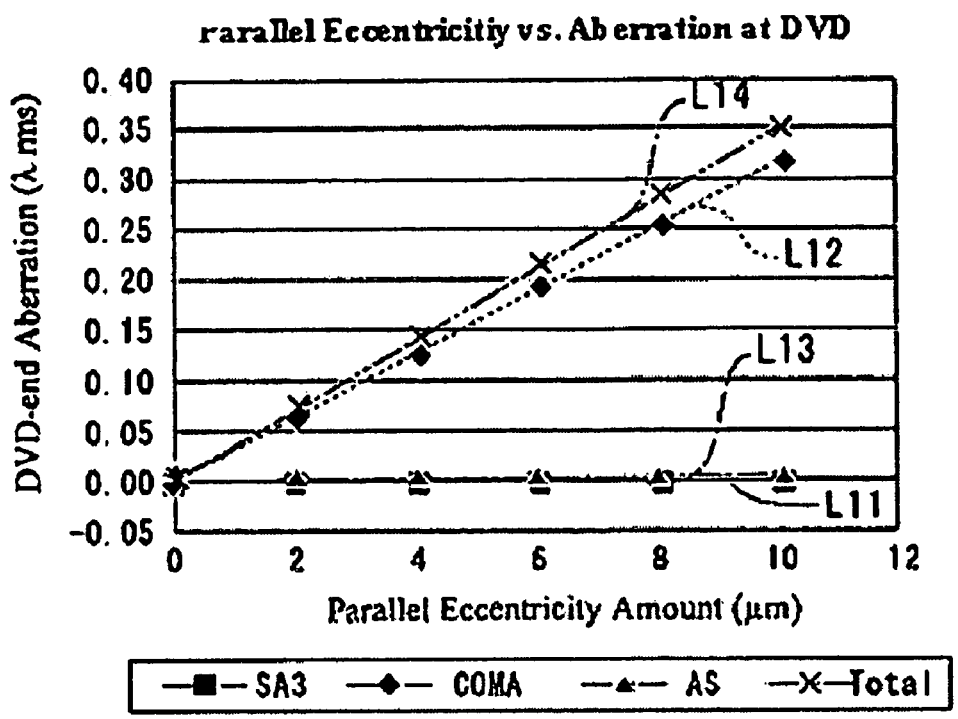
Fig.15-(b) Prior Art
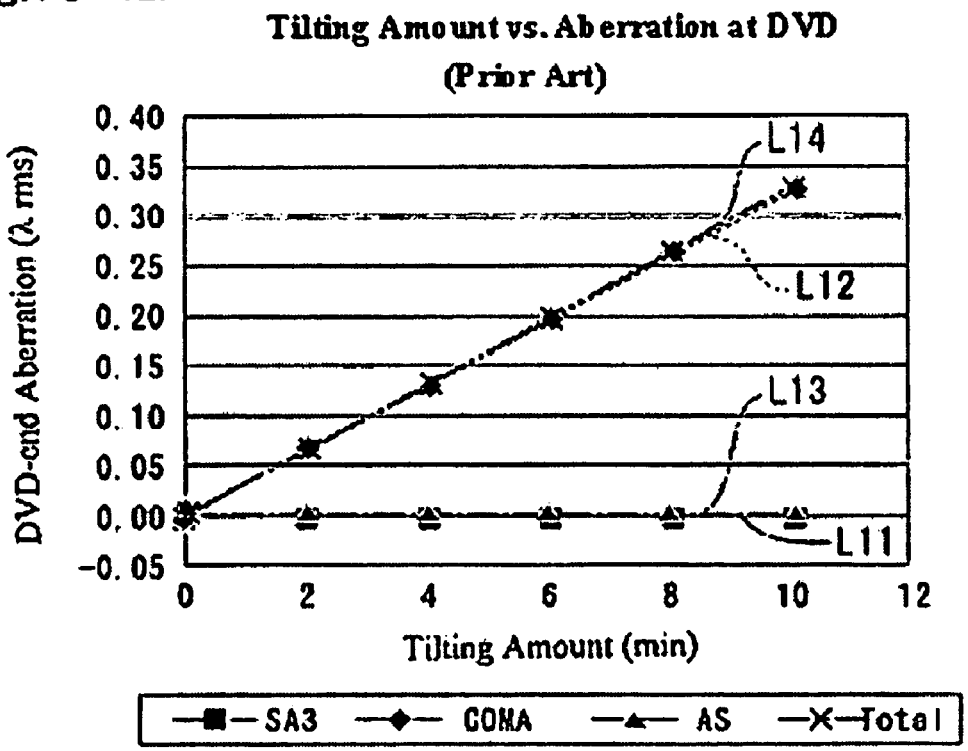

US 7,304,934 B2

LENS, OPTICAL HEAD APPARATUS, AND OBJECTIVE LENS FOR THE OPTICAL HEAD APPARATUS

FIELD OF THE INVENTION

The present invention relates to a lens that can diffract laser beams having different wavelengths, and an optical head apparatus using the lens as an objective lens.

The present invention also relates to an objective lens suited to reproduction and recording of data on an optical data storage media such as CDs, DVDs and the like having different substrate thicknesses utilizing laser beams of different wavelengths.

BACKGROUND OF THE INVENTION

Typical optical data storage media, represented by CDs, DVDs and the like, have transparent protective layers having different thicknesses required for protecting different recording surfaces. First laser beams of a 785 nm wavelength emitted by a first laser beam source are used for reproduction of data on CD-Rs; second laser beams of a 655 nm wavelength emitted by a second laser beam source are used for reproduction of data on DVD. To record and reproduce data on these two types of optical data storage media, a type of optical head apparatus utilizing a common objective lens has been proposed for its capability in converging laser beams on two types of recording surfaces of two types of optical data storage media (e.g., CD and DVD), thereby assisting reduction of size of the apparatus.

Nonetheless, CDs have a protective layer 1.2 mm thick for protecting the recording surface and DVDs have a protective layer of 0.6 mm, which is thinner than 1.2 mm of CDs, but has a higher recording density than CDs. To accommodate this difference, a diffraction grating having microscopic concentric notches is provided to the lens surface of the common objective lens that generates a single refracting power such that incoming laser beams are diffracted by the diffraction grating to form multiple focuses at different points on the optical axis thereof. (See Japanese Unexamined Patent Publication H09-120027, incorporated herein by reference). In this configuration, different orders of diffractions are allocated for the laser beams of the same wavelength, which is an inefficient way of utilizing light. To overcome this problem, another patent proposed a way of increasing efficiency thereof by allocating the same order of diffraction for laser beams of two different wavelengths. In this configuration, the laser beams excellently focus on recording surfaces of DVD and CD (See Japanese Unexamined Patent Publication 2000-81566, incorporated herein by reference).

The above mentioned objective lens of conventional technology is configured in the manner as illustrated in FIG. 11: between incoming end refracting surface 131 and outgoing end refracting surface 132, incoming end refracting surface 131 is divided, for example, into center end refracting surface region 133 having center end diffraction grating 135 and outer circumferential refracting surface region 134 having outer circumferential diffraction grating 136. The above objective lens is configured in the manner illustrated in FIG. 12. To record or reproduce data on CD 41 utilizing first laser beams L1 of 785 nm, diffracted beams obtained via center end refracting surface region 133 form beam spots B41 on the recording surface 41a of CD 41. To record or reproduce data on DVD 42 utilizing second laser beams L2 of 655 nm, first diffracted beams obtained via center end refractive surface region 133 and second diffracted beams obtained via outer circumferential refracting surface region 134 form beam spots B42 on recording surface 42a of DVD 42. Dividing refracting regions as described above allows the divided regions to have different aspheric coefficients or optical path differential functions, thereby optimizing properties for each CD 41 and DVD 42. The overall aberrations are thus minimized.

Generally, center end diffraction grating 135 and outer circumferential diffraction grating 136 can be constructed with multiple notches 135a and 136a shaped in sawteeth (in cross section) having a raised center and depressed outer circumference thereof. This configuration allows the diffracted beams emitted from center end refracting surface region 133 and diffracted beams emitted from outer circumferential diffraction grating 136 to produce (−1) first order diffracted beams. Hence, notches 135a and 136a point to the same direction because it is easier to mold objective lens 130 with notches pointing toward the same direction than objective lens 13 with notches pointing in different directions in view of manufacturing.

Nevertheless, the above objective lens 130 of conventional technology has drawbacks in that a change in temperature causes a change in refractive index and linear expansion in materials that form objective lens 130. In addition, a change in temperature causes a change in wavelength for laser beams, and then, a similar change in both first diffracted beams generated by center end diffraction grating 135 and second diffracted beams generated by outer circumferential diffraction grating 136. Usually, third order spherical aberrations are dependent on temperatures during recording and reproduction of data on DVD 42 which utilizes first diffracted beams generated by center end diffraction grating 135 and second diffracted beams generated by outer circumferential diffraction grating 136. FIG. 13 illustrates the results of a simulation that was carried out utilizing objective lens 130 considering a change in refractive index and linear expansion of materials forming objective lens 130. As is apparent from FIG. 13, the third order spherical aberration changes about 10 mλ at surrounding temperature of −5° C., which is the lowest end; it changes about 30 mλ at 55° C., which is the highest end. In other words, as the surrounding temperature changes ±30° C., the third order spherical aberration changes ±20 mλ.

The height of changes constituting a diffraction grating is $2\pi$, which is the phase of laser beams. However, it is first laser beams of 785 nm that is used for reproduction and recording of data on CDs and second laser beams of 655 nm that is used for reproduction and recording of data on DVDs that enter the diffraction grating. To accommodate these beams, heights of notches of diffraction gratings are set to $h_1$ and $h_2$, and are obtained by the following equations:

$$h_1 = \lambda_1/(n_1-1)$$

$$h_2 = \lambda_2/(n_2-1)$$

Alternatively, the height of notches of a diffraction grating may be set to $(h_1+h_2)/2$;

wherein $n_1$ is the refractive index of the objective lens for first laser beams L1; $n_2$ is the refractive index of the objective lens for second laser beams L2; $\lambda_1$ is a wavelength of first laser beams; and $\lambda_2$ is a wavelength of second laser beams.

FIG. 14(a) illustrates the S-curve properties (focusing error signal) of data taken under the condition that second laser beams are given priority over first laser beams and the height of notch for the diffraction grating is set to $h_2$. The resulting resolution expressed by the S-curve is excellent for DVDs but poor for CDs. Additionally, the resulting jitter levels representing data reproduction performance are excellent for DVDs, but only at the lowest level required by the CD specification.

In contrast, FIG. 14(b) illustrates the S-curve properties (focusing error signal) of data taken under the condition that first laser beams are given priority over second laser beams and the height of notch for a diffraction grating is set to $h_2$. The resulting resolution expressed by the S-curve is excellent for CDs but the amplitude thereof is too small for DVDs to accurately pick up focusing servo during data recording and reproduction of a dual layer disk. Additionally, a disk contaminated with fingerprints (e.g., fingerprint disk) may provide erroneous focusing servo. Moreover, the resulting jitter levels representing data reproduction performance are excellent for CDs, but are out of specification for DVDs, which does not allow DVDs to reproduce data thereon.

FIG. 14(c) illustrates the S-curve properties when the height of notch of a diffraction grating is $(h_1+h_2)/2$. The resulting resolution during data reproduction is as good as that shown in FIG. 14(b) for a CD but it is poor for DVDs than CDs even though DVDs require better resolution than CDs during data reproduction.

Alternatively, the refracting surface of the objective lens may be divided into the center end and the outer circumference, and the center end diffraction grating having notch of $(h_1+h_2)/2$ high may be provided at the outer circumference thereof such that beams diffracted by the center end diffraction grating are used for reproduction of data on a CD utilizing first laser beams while beams diffracted by the outer circumferential diffraction grating are used for reproduction of data on a DVD utilizing second laser beams. Conventionally, the height of notch for the outer circumferential diffraction grating is $h_2$ to increase efficiency of second laser beams. However, the inventors found that the use of the above configuration causes displacement in phases for those second laser beams diffracted by the center end diffraction grating and those diffracted by the outer circumferential diffraction grating. Frontwave aberrations thus deteriorate, thereby providing poor transmittivity for the overall lens.

Further, in the above objective lens of conventional technology, aberrations are eliminated by optimizing the shape of aspheric surfaces of the incoming end refracting surface and the outgoing end refracting surface in accordance with the wavelength of each laser beam. As a result, once centering on the incoming refracting surface and the outgoing end refracting surface fails, focusing on the recording surface of an optical data storage media fails. For example, FIG. 15(a) illustrates the relationship between parallel eccentricity at incoming end refracting surface and at outgoing end refracting surface and the third order spherical aberration (solid line L11), coma aberration (dashed line L12), aspheric aberration (one-dot broken line L13), and wavefront aberration (two-dot broken line L14). An increase in parallel eccentricity causes a significant deterioration in coma aberration and wavefront aberration, necessitating unrealistic accuracy for a metallic cast which allows mass production of the lens of this type.

When the objective lens tilts due to tilt controlling, laser beams do not focus well on the recording surface of an optical data storage medium. For example, FIG. 10(b) illustrates the relationship between tilting and the third order spherical aberration (solid line L1), coma aberration (dashed line L2), aspheric aberration (one-dot broken line L3), and wavefront aberration (two-dot broken line L4). As the objective lens tilts, coma aberrations and front wave aberrations significantly deteriorate, which is a problem.

In view of the previously described problems, the objective of the invention is to provide a diffractive lens configuration with an improved temperature property (resistance) for a lens capable of diffracting first and second laser beams having different wavelengths. It also provides an optical head apparatus that utilizes the lens as an objective lens.

Another objective of the present invention is to provide an optical head apparatus and an objective lens for the optical head apparatus that has excellent pick up properties even though first and second laser beams having different wavelengths are condensed on the recording surfaces of transparent protective layers of different thicknesses covering first and second optical data storage media via the objective lens having a diffractive lens structure.

Yet another objective of the present invention is to provide an optical head apparatus and an objective lens for the optical head apparatus that has excellent pick up properties even though the optical axes at the center of an incoming end refracting surface and at the outgoing end refracting surface of a lens having a diffractive lens structure are somewhat displaced in the direction perpendicular to the optical axes, or the optical axes are tilted.

SUMMARY OF THE INVENTION

To overcome the above described problems, the present invention provides a lens comprising: a refracting surface which is divided at least into an inner end refracting surface region that surrounds the optical axis thereof and an outer circumferential refracting surface region that surrounds the outside of the inner circumferential refracting region; wherein each of the divided regions provide different aspheric surfaces. Multiple microscopic concentric notches are provided throughout an inner circumferential diffraction grating and an outer circumferential diffraction grating, and each of the divided regions has a differential optical path function. The inner circumferential diffraction grating and at least a part of the outer circumferential diffraction grating emit diffracted beams of an order with different polarities.

In the above configuration in which the inner circumferential diffraction grating and at least a part of the outer circumferential diffraction grating emit diffracted beams of an order with different (opposite) polarities, the inner circumferential notches constituting the inner circumferential diffraction grating and the outer circumferential notches constituting the outer circumferential diffraction grating may be shaped in sawteeth in cross section and the inner circumferential notches may point to the optical axis while at least a part of the outer circumferential notches point to the outer circumference.

In the present invention, the inner circumferential diffraction grating and at least a part of the outer circumferential diffraction grating emit diffracted beams of an order with different (opposite) polarities. As a result, even though a change in temperature causes a change in refractive index or linear expansion in lens materials, or a change in temperature causes a change in wavelength of laser beams, spherical aberrations derived from such a change in temperature are complemented by the inner and the outer diffraction gratings. If the objective lens of this present invention is applied to an optical head apparatus to be utilized as a common objective lens thereof, it suppresses fluctuations in spherical aberrations derived from a change in surrounding temperature during recording and reproduction of data on an optical data storage medium which utilizes diffracted beams generated by the inner and outer circumferential diffraction gratings. Hence, servo signal and jitter levels are deteriorated little, thereby providing excellent pick up properties.

Further in the present invention, the refracting surface is divided into two divisions, for example, to accommodate laser beams having two (different) wavelengths at a point corresponding to the numerical aperture (NA) of the first optical data storage medium in the center end refracting surface regions around the optical axis (including the optical axis) and in the outer circumferential refracting region. In order to accommodate (n) (different) wavelengths, the refracting surface has (n) divisions. This simplest and easy-to-design configuration allows beams inside the given NA to form an excellent spot on the recording surface while it allows beams outside NA to flare easily (automatically).

Desirably, in this embodiment, one of (first) diffracted beams emitted from the inner circumferential diffraction grating and (second) diffracted beams emitted from at least a part of the outer circumferential diffraction grating are +1 (first) order diffracted beams while the other (first or second) diffracted beams are −1 (first) order diffracted beams. In other words, the use of ±1 (first) order diffracted light is desirable because it provides the highest efficiency with the lowest notches.

The optical head apparatus of the present invention is utilized as a common objective lens in an optical head apparatus in such a manner that through the common objective lens first laser beams are condensed onto the recording surface of a first data storage medium and second laser beams of a shorter wavelength than the first laser beams are condensed onto the recording surface of a second optical data storage medium being covered by a transparent protective layer which is thinner than the first optical data storage medium, for example. For recording and reproduction of data on the first optical data storage medium thereof utilizing a first laser beam source are selected diffracted beams obtained via a center end refracting surface region around the optical axis, which is the inner circumferential refracting surface region. For recording and reproduction of data on a second optical data storage medium utilizing a second laser beam source are selected diffracted beams obtained via the center end refracting surface region and the outer circumferential refracting surface region and the center end refracting surface region. The outer circumferential refracting surface region are divided by a numerical aperture required for recording or reproduction of data on the first optical data storage medium.

Alternatively, the optical head apparatus of the present invention is utilized as a common objective lens in an optical head apparatus in such a manner that through the common objective lens, first, second, and third laser beams are condensed, for example. The first laser beams are condensed onto the recording surface of a first data storage medium. Second laser beams of a shorter wavelength than the first laser beams are condensed onto the recording surface of a second optical data storage medium being covered by a transparent protective layer which is thinner than the first optical data storage medium. Third laser beams of a shorter wavelength than the second laser beams are condensed on the recording surface of a third optical data storage medium, which is thinner than the second optical data storage medium. For recording and reproduction of data on a first optical data storage medium in this optical head apparatus utilizing a first laser beam source are selected diffracted beams obtained via a center end refracting surface region around the optical axis, which is the inner circumferential refracting surface region. For recording and reproduction of data on a second optical data storage medium utilizing a second laser beam source are selected diffracted beams obtained via the center end refracting surface region and a middle portion toward the inner circumference defined by two divisions formed on the outer circumferential refracting surface region. For recording and reproduction of data on a third optical data storage medium utilizing a third laser source are selected diffracted beams obtained via the center end refracting surface region; diffracted beams obtained via the middle portion; and diffracted beams obtained via the outer circumferential portion surrounding the middle portion in the outer circumferential refracting surface region. The center end refracting surface region and the outer circumferential refracting surface region are divided by a numerical aperture required for recording or reproduction of data on the first optical data storage medium. The middle portion and the outer circumferential portion in the outer circumferential refracting surface region are divided by a numerical aperture required for recording or reproduction of data on the second optical data storage medium.

Desirably, in the present invention, notches formed over least a part of the outer circumferential refracting surface region are depressed in the center and raised toward the outer circumference. It is important to note that if the direction in which notches are arranged is reversed by increasing the height of notches in the center and decreasing the channel (height) toward the outer circumference, the lens surface is tilted so much that notches thereof face incoming beams at a large angle, thereby generating unwanted light.

Also desirably, in the present invention, for reproduction of data on the second optical data storage medium utilizing the second laser beams, one of diffracted beams of an order with a different (opposite) polarity obtained via the center end diffraction and at least a part of the outer circumferential diffraction grating are, for example, of −1 (first) order while the other diffracted beams are of +1 (first) order.

To further help overcome the problems described previously, the optical head apparatus of the present invention has a common objective lens through which first laser beams emitted from a first laser beam source are condensed onto the recording surface of a first optical data storage medium, and second laser beams of a wavelengths shorter than the first laser beams that are emitted from a second laser beam source are condensed onto the recording surface of a second optical data storage medium being covered by a transparent protective layer which is thinner than the first optical data storage medium. The refracting surface of the objective lens is divided into a center end refracting surface region around the optical axis thereof and an outer circumferential refracting surface region surrounding the outside of the center end refracting surface region. Multiple microscopic concentric notches are provided throughout the center end refracting surface region, thereby providing a center end diffraction grating. For reproduction of data on the first optical data storage medium utilizing the first laser beam source are selected diffracted beams obtained via the center end refracting surface region; for reproduction of data on the second optical data storage medium utilizing the second laser source are selected beams that passed through the outer circumferential refracting surface region and diffracted beams obtained via the center end refracting surface region. The height H of notches of the center end diffraction grating is expressed by the following equation:

$$h_2 < H < (h_1 + h_2)/2$$

where $h_1 = \lambda_1/(n_1 - 1)$
$h_2 = 2/(n_2 - 1)$ wherein H is the height of notches of the center end diffraction grating; $n_1$ is the refractive index at the center end refracting surface region where the first laser beams of a wavelength $\lambda_1$ enter; $n_2$ is the refractive index of the center end refracting surface region where second laser beams of a wavelength $\lambda_2$ enter.

Another invention pays attention to the fact that the second optical data storage medium and the second laser beams are used for high density data storage and the height of notch of center end diffraction grating is set to a numerical value close to the height required for accommodating second laser beams than a mean between the height corresponding to first laser beams and the height corresponding to second laser beams. In other words, the height of notch is set utilizing (a numerical value) corresponding to the complexities of data reproduction operation obtained by weighted average with reference to the pit size and the beam spot size. The S-curve amplitude for second optical data storage medium thus obtained is large enough to provide focusing servo on a fingerprint disk. This invention also maintains servo focusing on a dual layer disk and excellent pick up properties for both first and second optical data storage media. Additionally, the height for notch of the center end diffraction grating is set to a numerical value closer to $h_2$, which corresponds to second laser beams of a shorter wavelength, than a mean between $h_1$ and $h_2$. In this way, even if wavelengths of second laser beams increase due to a rise in temperature, the height H of notches at a center temperature corresponds to a wavelength which is close to second laser beams, thereby absorbing the above increase in wavelength. Excellent pick up properties are thus obtained for a second optical data storage medium.

Also desirably, in the present invention, the height H of the notch on the center end diffraction grating is set to meet the following equation:

$$H=(S_1 \times h_2 + S_2 \times h_1)/(S_1+S_2)$$

wherein $S_1$ is a pit area on the recording surface of the first optical data storage medium to be recorded or reproduced by the first laser beams; $S_2$ is a pit area on the recording surface of the second optical data storage medium to be recorded or reproduced by the second laser beams.

Also desirably in the present invention, the height H of the notch on the center end diffraction grating is set to meet the following equation:

$$H=(\phi_1^2 \times h_2 + \phi_2^2 \times h_1)/(\phi_1^2+\phi_2^2)$$

wherein $\phi_1$ is the diameter of a beam spot formed on the recording surface of the first optical data storage medium by first laser beams; $\phi_2$ is the diameter of a beam spot formed on the recording surface of the second optical data storage medium by second laser beams; and H is the height of the center end diffraction grating.

Also desirably in the present invention, the height H of the notch of the center end diffraction grating is set to meet the following equation:

$$H=(k \times h_2 + 1 \times h_1)/(k+1)$$

where k=2.6-4.0.

Also desirably in the present invention, the outer circumferential refracting surface region provides a refracting power that is suitable for the second laser beams to form the second beam spots on the recording surface of the second optical data storage medium. If one intends to provide a diffraction grating in the outer circumferential refracting surface region, microscopic notches are formed with a very narrow pitch. However, the use of a refractive power in condensing second laser beams on to the recording surface of a second optical data storage medium eliminates a need for formation of microscopic notches with a very narrow pitch in the outer circumferential refracting surface region. This also eliminates loss caused by the presence of (unnecessary) notches.

In the present invention, an outer circumferential diffraction grating is made up with multiple microscopic concentric notches formed throughout the outer circumferential refracting surface region. For recording and reproducing data on the second optical data storage medium utilizing the second laser beam source are selected diffracted beams obtained via the center end refracting surface region and diffracted beams obtained via the outer circumferential refracting surface region. In this configuration, it is desirable that the height H of notches constituting the outer circumferential diffraction grating is set to be the same as the notch height of the center end diffraction grating. In another configuration in which the notch height of the center end diffraction grating is H, and the height of notches of the outer circumferential diffracting grating is $h_2$, a phase mismatch occurs between the center end diffraction grating and the outer circumferential diffraction grating, deteriorating frontwave aberrations. Importantly, if the height is set to H for notches on both the center end diffraction grating and the outer circumferential grating, no gratings cause a phase mismatch. Hence, excellent frontwave aberration is obtained and transmittivity of the overall lens is improved.

Next, the present invention relates to an objective lens for use in an optical head apparatus. The objective lens of the present invention has a refractive surface having the previously described configuration.

To further help overcome the previously described problems, the present invention provides an optical head apparatus having a common objective lens through which first laser beams emitted from a first laser beam source are condensed onto the recording surface of a first optical data storage medium, and second laser beams of a shorter wavelength than the first laser beams are condensed onto the recording surface of a second optical data storage medium which is thinner than the first optical data storage medium. The objective lens comprises: an incoming end refracting surface of a given aspheric shape; and an outgoing end refracting surface of a given aspheric shape. One of the refracting surfaces is divided into an inner end refracting surface region around the optical axis of the objective lens wherein at least the inner circumferential refracting surface region is provided to it with an inner circumferential diffraction grating having multiple microscopic concentric notches throughout the inner circumferential refracting surface region. In the other refracting surface, its aspheric surface is tilted within the range of $0° \leq \theta \leq 10°$ where $NA \geq 0.5$. For reproduction of data on the first optical data storage medium utilizing the first laser beam source are selected diffracted beams obtained via the inner circumferential refracting surface region; for reproduction of data on the second optical data storage medium utilizing the second laser beam source are selected beams that passed through the outer circumferential refracting surface region and diffracted beams obtained via the center end refracting surface region.

Herein, the angle $\theta$ on the microscopic aspheric surface is defined by the optical axis and a normal line at a given point away from the optical axis on the lens surface. The given point, in this embodiment, is a point in the region where $NA \geq 0.5$, which is the effective range for data reproduction of data on DVDs.

Between the incoming end refracting surface and the outgoing end refracting surface, the refracting surface, which is arranged opposite to the refracting surface having a diffraction grating, is defined by tilting of its aspheric surface within the range of $0° \leq \theta \leq 10°$. This small range of tilting little affects aberration even though centering of the incoming end refracting surface and the outgoing end refracting surface deteriorates, thereby focusing excellently on the recording surface of an optical data storage medium. Additionally, this small range of tilting little affects aberrations even though tilting of the objective lens changes on the incoming end refracting surface and the outgoing end refracting surface due to tilting control or the like, thereby focusing excellently on the recording surface of an optical data storage medium.

In the present invention, an outer circumferential diffraction grating has multiple microscopic concentric notches formed throughout said outer circumferential refracting surface region. For recording and reproducing data on said second optical data storage medium utilizing said second laser beam source may be selected diffracted beams obtained via said inner circumferential refracting surface region and diffracted beams obtained via said outer circumferential refracting surface region.

Also in the present invention, a numerical aperture (NA) on the objective lens meets the following equation:

$0.55 \leq NA \leq 0.65$.

Desirably, the present invention is applied to an optical head apparatus having an objective lens whose focal length for the second laser beams at the center of optical axis of the objective lens meets the following equation:

$d/f \geq 0.665$.

wherein (d) is a lens thickness and (f) is a focal length.

In this configuration, if the focal length is off the previously defined conditions, off centering of the incoming end refracting surface and the outgoing end refracting surface or inclination in the objective lens affects aberrations but the impact thereof is minimal. Therefore, the present invention provides an excellent aberration control for an objective lens in which (accuracy of) centering of the incoming end refracting surface and the outgoing end refracting surface or tilting of the objective lens plays a major role.

BRIEF DESCRIPTION OF THE DRAWINGS

FIGS. 5(a), (b), (c) and (d) are a plan view, a cross sectional view, a magnified cross sectional view of the center end refracting surface region around the optical axis, and a magnified cross sectional view of notches provided in the center end refracting surface region.

FIG. 7(a) is a plan view of the objective lens of Configuration (3) having a diffraction grating in the outer end refracting surface region. FIG. 7 (b) is a cross section thereof. FIGS. 7(c) and (d) each are magnified cross section of the part.

FIGS. 8(a), (b), (c) and (d) each are a plan view, a cross sectional view, a magnified cross sectional view of the inner circumferential refracting surface region of the refracting surface at the incoming end, and a magnified cross sectional view of the refracting surface at the outgoing end.

FIG. 10(a) illustrates the relationship between parallel eccentricity of the objective lens of Configuration (4) of FIG. 8 and the third order spherical aberration, coma aberration, aspheric aberration, and wavefront aberration. FIG. 10(b) illustrates the relationship between tilting of the objective lens of Configuration (4) illustrated in FIG. 8 and the third order spherical aberration, coma aberration, aspheric aberration, and wavefront aberration.

FIGS. 11(a), (b), (c) and (d) each illustrates the objective lens of conventional technology in a plan view, a cross sectional view, a magnified cross sectional view of the center end refracting surface region around the optical axis, and a magnified cross sectional view of the outer circumferential region surrounding the center end refracting surface region respectively.

FIGS. 14(a), (b), and (c) each is a graph illustrating the S-curve properties of the object lens of conventional technology.

FIG. 15(a) illustrates the relationship between parallel eccentricity of the objective lens of conventional technology and the third order spherical aberration, coma aberration, aspheric aberration, and wavefront aberration. FIG. 15(b) illustrates the relationship between tilting of the objective lens of conventional technology and the third order spherical aberration, coma aberration, aspheric aberration, and wavefront aberration.

DETAILED DESCRIPTION OF THE INVENTION

Figure 1:
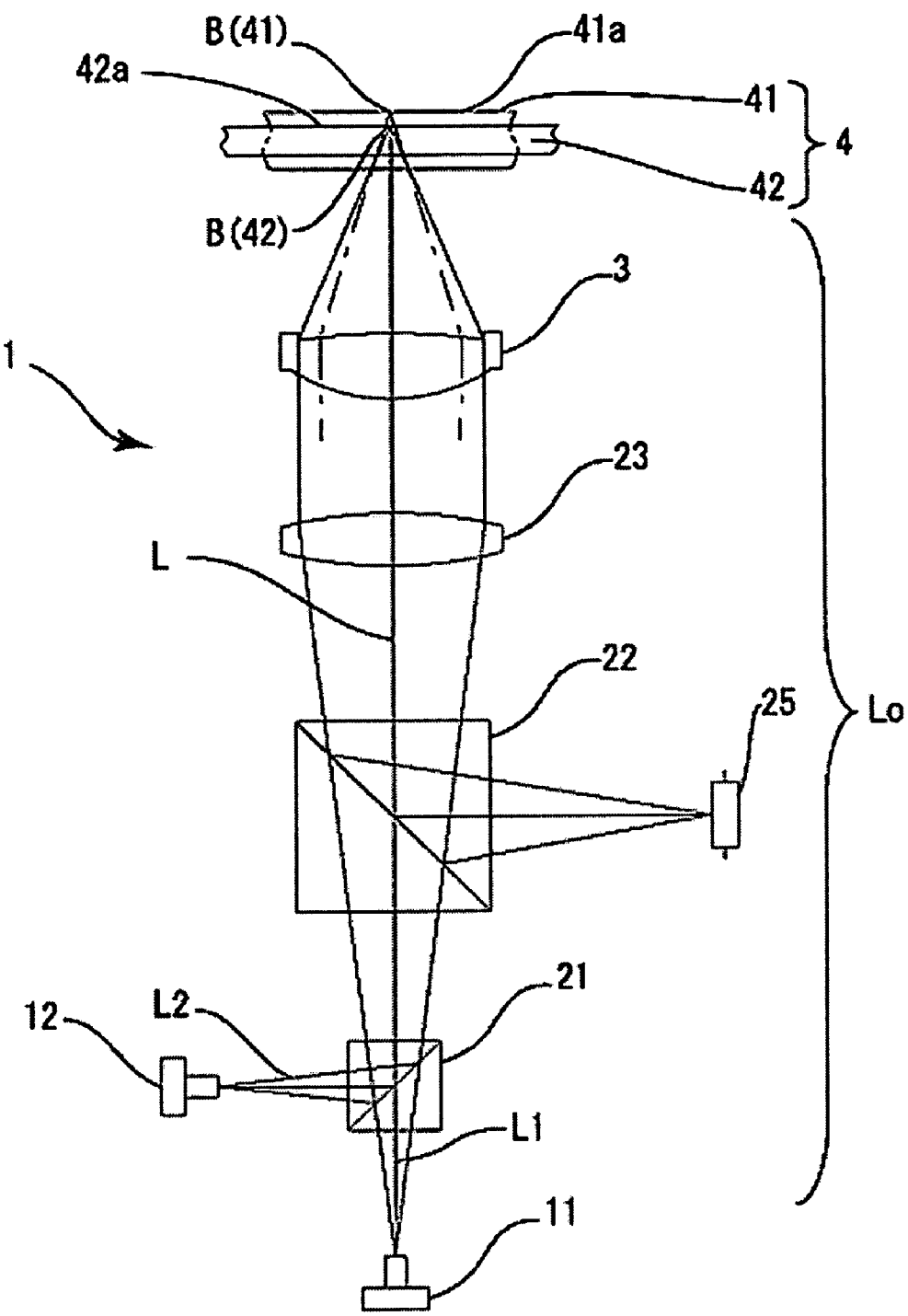
FIG. 1 is a schematic showing the optical system of the optical head apparatus as a major component suited to the present invention.

FIG. 1 is a schematic diagram illustrating the optical system of the optical head apparatus of the present invention.

In FIG. 1, optical head apparatus 1 of the present invention plays and records data on an optical data storage medium 4 of multiple types (e.g. CD, CD-R, DVD) of different thicknesses and data recording densities. For this reason, optical head apparatus 1 comprises: a first laser source 11 that emits first laser beam L1 whose center wavelength is 785 nm for recording and reproducing data to and from CDs; and a second laser source 12 that emits second laser beam L2 whose center wavelength is 655 nm for recording and reproducing data to and from DVDs. Each laser beam is guided to optical data storage medium 4 via a common condensing optical system Lo and the beam returned by optical data storage medium 4 is guided to common reception element 25.

Condensing optical system Lo comprises: a first beam splitter 21, which lets first laser beam L1 to progress straight and reflects second laser beam L2 such that first laser beam L1 and second laser beam L2 together conjugate with the optical axis L of the system the optical axis of an objective lens; a second beam splitter 22 which lets laser beams L1 and L2 pass therethrough wherein beams L1 and L2 progress along system's optical axis L; a collimate lens 23, which splits laser beams L1 and L2 that passed second beam splitter 22 into two parallel beams; and an objective lens 3, which forms a spot of laser beams L1 and L2 emitted by a collimate lens 23 onto the recording surface of optical data storage medium 4.

In optical head apparatus 1 of the previously described configuration, objective lens 3 projects a spot of first laser beams L1 onto recording surface 41a of CD 41, which is first optical data storage medium 4. It also projects a spot of second laser beams L2 onto recording surface 42a of DVD 42.

First and second laser beams L1 and L2 are thus condensed onto optical data storage medium 4 (e.g. CD 41, DVD 42) are reflected therefrom, and then, returned through the common condensing optical system Lo until they are reflected by second beam splitter 22 to be condensed at common reception element 25. Common reception element 25 detects the signal required for operations such as reproduction of data on optical data storage medium 4 (CD 41, DVD 42).

Figure 2:
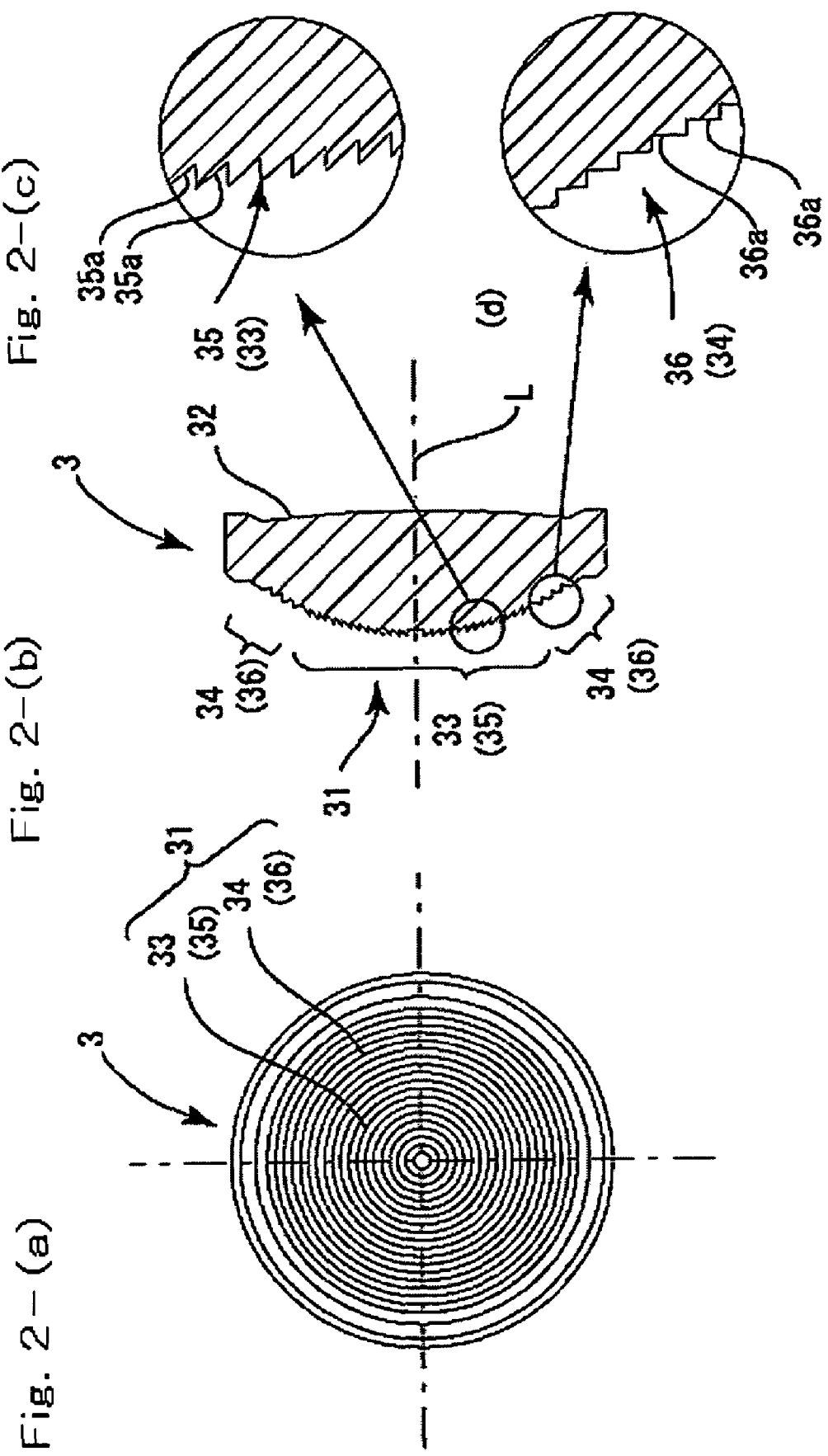
FIGS. 2(a), (b), (c) and (d) are a plan view, a cross sectional view, a magnified cross sectional view of the center end refracting surface region around the optical axis, and a magnified cross sectional view of the outer circumferential region surrounding the center end refracting surface region.
Figure 3:
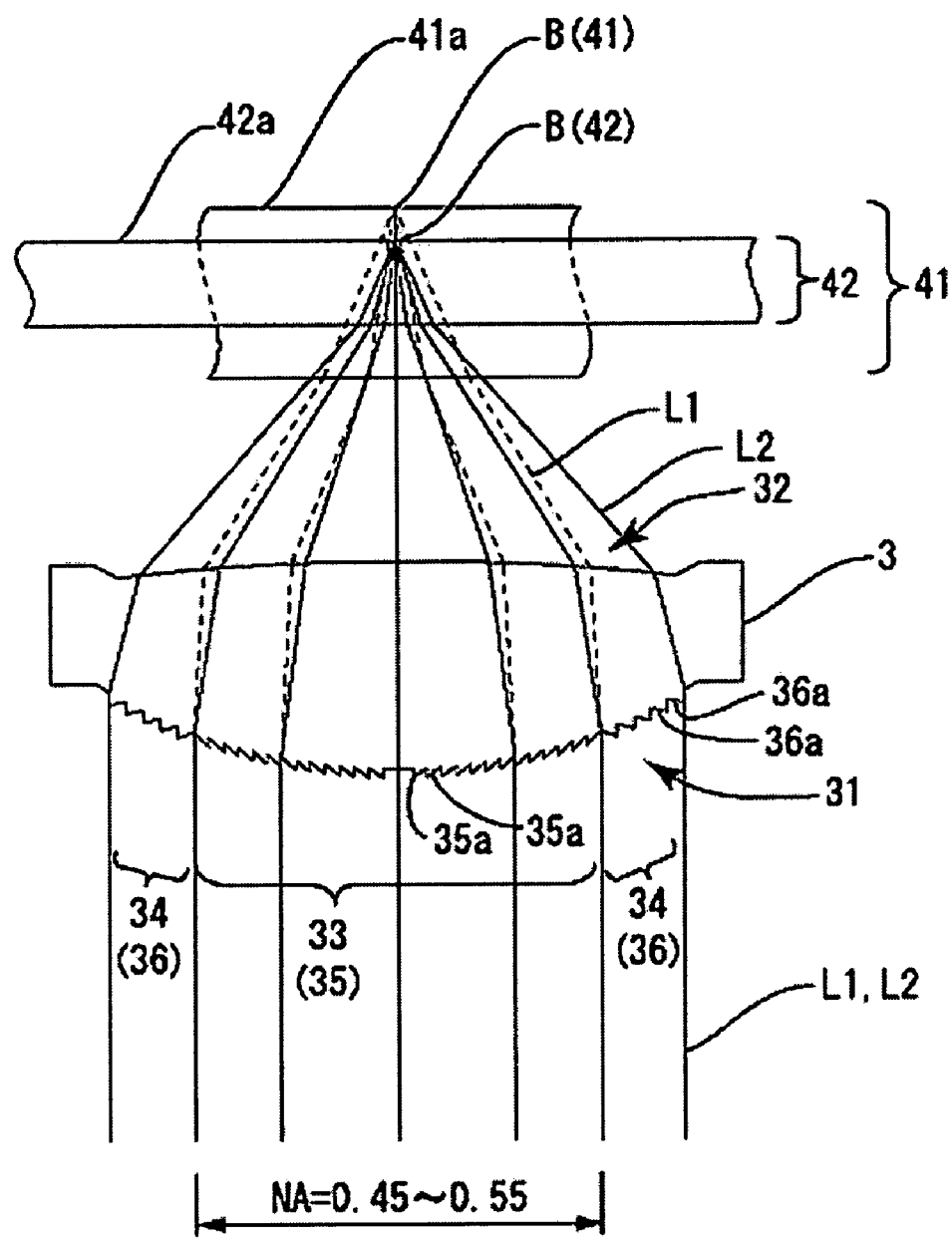
FIG. 3 is a diagram illustrating first laser beams and second laser beams converging on the object lens of Configuration (1) of FIG. 2.
Figure 4:
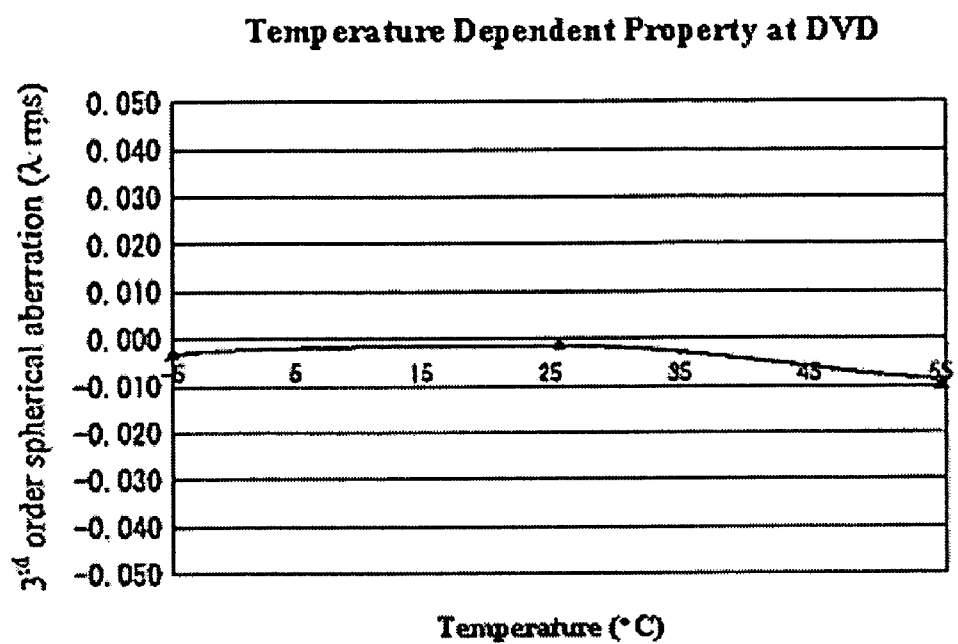
FIG. 4 is a graph plotting data points obtained by simulating the third order spherical aberrations that occurred on a DVD using the objective lens of Configuration (1).

Configuration (1) of objective lens 3 of this embodiment is described herein with reference to FIGS. 2 and 3. FIGS. 2(a), (b), (c), and (d) are a plan view, a cross sectional view, a magnified cross sectional view of a center end refracting surface region around the optical axis thereof, and a magnified cross sectional view of a part of the outer circumferential region surrounding the center end refracting surface region. FIG. 3 is a diagram illustrating (the objective lens) of Configuration 1 on which laser beams of each wavelength converge. FIG. 4 is a graph plotting data points obtained by simulating the third order spherical aberrations on DVD 42 using objective lens 3 of Configuration 1.

In FIGS. 2(a), (b), (c), and (d), objective lens 3 of Configuration 1 is a convex lens having surfaces that comprises: an incoming end refracting surface 31 having a positive power of laser beams L1 and L2 that are emitted by first light source 11 and second light source 12 respectively; and an outgoing end refracting surface 32 which emits the laser beams toward optical data storage medium 4.

Incoming refracting surface 31 is divided into two regions, a circular center end refracting surface region 33 and outer circumferential refracting surface region 34, wherein region 33 contains the optical axis L and a concentric circular region around the optical axis L and region 34 circularly surrounds the outer circumference of center refracting surface region 33. The border between center refracting surface region 33 and outer circumferential refracting surface region 34 is at NA of 0.45-0.55 wherein NA is the numerical aperture of CD 41 (first laser beam L1).

The incoming end refracting surface is divided into two sections because two laser beams having two different wavelengths are used in this embodiment to record and reproduce data on two types of optical data storage media.

Multiple microscopic concentric notches 35a are formed throughout center refracting surface region 33, thereby providing center end diffraction grating 35. Microscopic concentric notches 36a are formed throughout outer circumferential refracting surface region 33, thereby providing center end diffraction grating 36.

Center end diffraction grating 35, which is provided in center refracting surface region 33, diffracts first laser beams L1 that pass therethrough to form a beam spot thereof onto the recording surface of CD 41.

Additionally, center end diffraction grating 35, which is provided in center end refracting surface region 33 diffracts second laser beams L2 that pass therethrough to form a beam spot thereof onto the recording surface of DVD 42.

Outer circumferential diffraction grating 36, which is provided in outer circumferential refracting surface region 34, diffracts second laser beams L2 that pass therethrough to form a beam spot thereof onto the recording surface of DVD 42.

Now, the beam components of first laser beams L1 that are passing through outer circumferential diffraction grating 36 are unwanted components because they are useless in recording or reproduction of data. In this embodiment, therefore, these unwanted beam components are diffracted by outer circumferential diffraction grating 36, which is provided on outer circumferential refracting surface region 34, such that they are not condensed at the point where a beam spot is formed on a recording surface of CD 41.

In objective lens 3 of Embodiment (1) of the present invention, notches 35a of center diffraction grating 35 and notches 36a of outer circumferential diffraction grating 36 are shaped as sawteeth in cross section.

Note that in this embodiment, the height of notches 35a of center diffraction grating 35 is lowered from the center toward the outer circumference, in other words, the center is high and the outer circumference is low while notches 35a are shaped in sawteeth pointing toward the optical axis. Notches 36a on outer circumferential diffraction grating 36 elevate from the center toward the outer circumference thereof, as illustrated in FIG. 2(d). This means that in notches 36a, the center is low and the outer circumference is high while notches 36a are shaped in sawteeth pointing toward the outer circumference. In short, notches 35a of center diffraction grating 35 and notches 36a of outer circumferential diffraction grating 36 have sawteeth (in cross section) pointing toward the opposite direction.

Alternatively, the entire region covered by notches 36a of outer circumferential diffraction grating 36 does not necessarily have to be elevated from the center toward the outer circumference, and a part of outer circumferential diffraction grating may be elevated from the center to the outer circumference. For example, one may divide outer circumferential refracting surface region 34 into three sub-regions such that sub-divisions at the height (of the inside) and the outside (of the middle subdivision) are lowered from the outer circumference to the center; while the middle subdivision is lowered from the center end toward the outer circumference. However, there should be only one differential function for the optical path which defines outer circumferential diffraction grating 36, which is different from the differential function for the optical path which defines inner circumferential diffraction grating 35.

Alternatively, notches 35a of center diffraction grating 35 and notches 36a of outer circumferential diffraction grating 36 may point to the direction opposite to that of this embodiment as long as the sawteeth (in each grating) point to the opposite direction.

Hence, in this embodiment, the order of diffraction of diffracted beams emitted through center refracting surface region 33 is given the opposite polarity to that of diffraction beams emitted from outer circumferential refracting surface region 34. In this embodiment, the diffracted beam emitted through center refracting surface region 33 is a −1 (first) order diffraction beam component; the diffraction beam emitted from outer circumference refracting surface region 34 is a +1 (first) order diffraction beam component. As a result, −1 (first) order component being diffracted by center diffraction grating 35 and +1 (first) order component being diffracted by outer circumferential diffraction grating 36 incorporate each other to form a spot B42 of diffracted laser beams L2 on recording surface of DVD 42.

Note that the absolute value of the order of diffraction for outer circumferential diffraction grating 36 may be greater than that of center diffraction grating 35. For example, if center diffraction grating 35 produces diffracted beams of the first order, the outer circumferential diffraction grating 36 may produce diffracted beams of the second order. If outer circumferential diffraction grating 36 produces diffracted beams of +3 (third) order for one part thereof, the other part thereof produces diffracted beams of −3 (third) order such that the same absolute value is maintained within the outer circumferential diffraction grating 36 for the order of diffraction thereof.

For reproduction of data on CD 41 in optical head apparatus 11 thus configured, only first laser source 11 is actuated to emit first laser beams L1. As a result, first laser beam L1, as shown in dashed lines in FIG. 3, passes center refracting surface region of objective lens 3 and generates spots B41 of first diffracted component formed by center diffraction grating 35 on the recording surface of CD 41.

In contrast, for reproduction of data on DVD 42, only second laser source 12 is actuated to emit second laser beams L2. As a result, second laser beams L2, as shown in solid lines in FIG. 3, passes center refracting surface region 33 and outer circumferential refracting surface regions 34 of objective lens 3. Then, −1 (first) diffracted component generated by center diffraction grating 35 in center refracting surface region 33, and +1 (first) diffraction component generated by outer circumferential diffraction grating 36 in outer circumferential bending region 34 incorporate each other to form a spot B42 of diffracted beams thereof on the recording surface of DVD 42.

Here, in objective lens 3 having notches 35a constructing center diffraction grating 35 and 36a constructing outer circumferential diffraction grating 36, each sawteeth shaped notch 35a and 36a points to the opposite direction, necessitating the order of diffracted beams emitted from center refracting surface region 33 and the order of diffracted beams emitted from outer circumferential refracting surface region 34 to have opposite polarities. For this reason, even though a change in temperature causes a change in refractive index or linear expansion and further causes a change in wavelength of second laser beam L2 emitted from second laser source 12, center diffraction grating 35 and outer circumferential diffraction grating 36 complement (absorb) any change in spherical aberrations derived from the above change in temperature. The resulting temperature property (resistance) of first laser beam L1 for use in low density DVD 42 remains the same as those of conventional technology. However, the resulting temperature property (resistance) of second laser beam L2 for use in high density DVD 42 are better than those of conventional technology. This means that (configuration (1)) provides excellent optical pick up properties required for data reproduction on DVD 42, which utilizes diffracted beams from center diffraction grating 35 and outer circumferential diffraction grating 36, because aberrational fluctuations do not occur on the spherical surface thereof even though the surrounding temperature changes. Therefore, servo signaling fluctuates little and jitter levels deteriorate little.

For example, in light of objective lens 3 of the present invention, a change in the third order spherical aberrations were measured as a function of temperatures to simulate a change in refractive index or linear expansion of materials constituting objective lens 3. FIG. 4 illustrates the result of the simulation in which little change was observed at the lower temperature end of −5° C. and a change of 10 mλ or less at the higher end of 55° C.

Also in this embodiment, the border between center refracting surface region 33 and outer circumferential refracting surface region 34 of incoming end refracting surface 31 of objective lens 3 coincides with the area having the numerical aperture (NA) of 0.45-0.55 on CD 41 (first laser beam L1). Therefore, (objective lens 3) can be configured such that it does not condense laser beams L1 on a focal point on center refracting surface region 33 even though first laser beam L1 passes through outer circumferential refracting surface region 34 by making aberrations of both first laser beam L1 and second laser beam L2 very small in center refracting surface region 33 while making aberrations of second laser beam L2 very small in outer circumferential refracting surface region 34. Compared to the type in which center refracting surface region 33 or outer circumferential bending region 34 contains numerical apertures of CD 41 (first laser beam L1), the above configuration of this embodiment keeps aberrations very small within desired numerical apertures, generating no noise outside of the numerical apertures. Additionally, center end diffraction grating 35 and outer circumferential diffraction grating 36 of this configuration require a simple design.

Moreover, the configuration of this embodiment utilizes ±1 (first) order diffracted beams generated by center diffraction grating 35 and outer circumferential diffraction grating 36 on objective lens 3, thereby providing more efficient data reproduction for CD 41 and DVD 42 than the type using diffracted beams of the second order or higher.

Any groove formation process can easily machine a metallic cast for molding objective lens 3 of the present invention as long as notches 35a and 36a are press cut by pressing a bite with flat edges because the bite has sharp edges on both sides. Alternatively, one may directly press cut transparent material using a bite with flat edges to form notches 35a and 36a.

In the above embodiment, diffracted beams emitted by center refracting surface region 33 are −1 (first) order diffracted light component while diffracted beams emitted by outer circumferential refracting surface region 34 are +1 (first) order diffracted light component. However, diffracted beams emitted by center refracting surface region 33 may be +1 (first) order diffracted beam component while diffracted beams emitted by outer circumferential refracting surface region 34 are −1 (first) order diffracted beam component.

To reproduce data on three optical data storage medium utilizing laser beams having three different wavelengths, the refracting surface is divided into three different regions. At least one of the divided regions has notches pointing the opposite direction to (that of the rest of the divided regions). Notches at the most outer circumference region should look like these shown in FIG. 2(d) in which heights of notches increase from the center to the outer circumference.

Assume that one intends to condense first laser beam onto the recording surface of first optical data storage medium and to condense second laser beams having a shorter wavelength than first laser beam on the recording surface of the second optical data storage medium whose protective layer covering the recording surface is thinner than that of the first optical recording medium, and to condense third laser beams having a shorter wavelength than second laser beam on the recording surface of the third optical data storage medium whose protective layer covering the recording surface is thinner than that of the second optical recording medium. To reproduce data on the first optical data storage medium utilizing the first laser source, diffracted beams obtained via the center end refracting surface region around the optical axis (inner circumferential refracting surface region) are used. To reproduce data on the second optical data storage medium, the second laser source provides beams to be diffracted through the center refracting surface region and beams to be diffracted through the middle portion toward the inner circumference end of the two divisions of the outer circumferential refracting surface region. To further reproduce data on the third optical data storage medium, the third laser source provides beams to be diffracted through the center refracting surface region and beams to be diffracted through the outer circumferential portion surrounding the middle portion created in the outer circumferential refracting surface region.

Now, the center refracting surface region and the outer circumference refracting surface region are divided by the numerical aperture required for reproducing data on the first optical data storage medium. The middle portion of the outer circumferential refracting surface region and the outer circumferential portion are divided by the numerical aperture required for data reproduction of the second optical data storage medium.

In the above embodiment, the present invention is applied to objective lens 3 of optical head apparatus 1. However, it may be applied to collimate lens 23, for example, which lets laser beams having different wavelengths pass therethrough.

Figure 6:
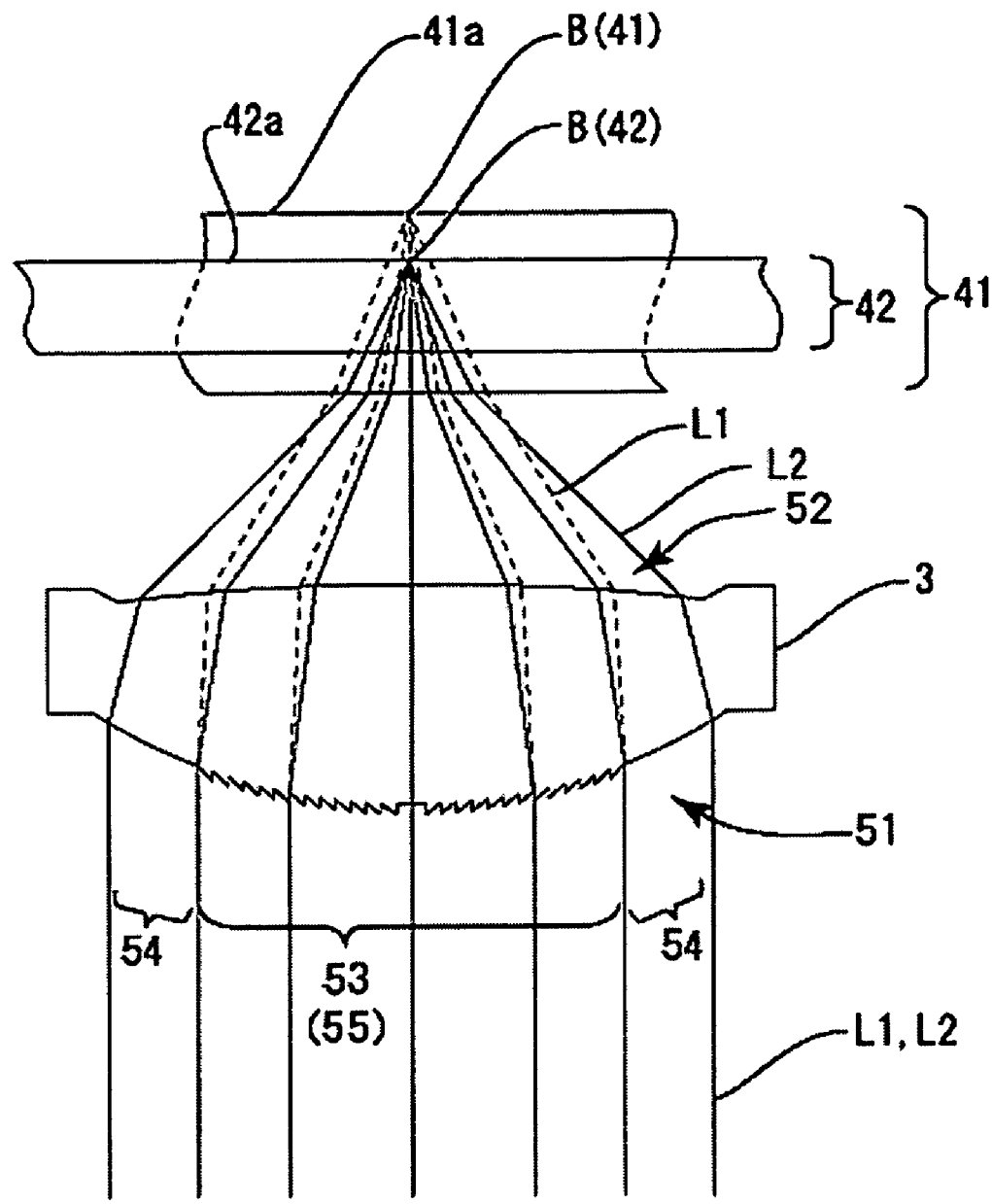
FIG. 6 is a diagram illustrating first and second laser beams of FIG. 5 wherein fist and second laser beams are being converged by the object lens of Configuration (2).

Configuration (2) of objective lens 3 is described in detail herein with reference to FIGS. 5 and 6. FIGS. 5(a), (b), (c), and (d) are a plan view, a cross sectional view, a magnified cross sectional view of the center end refracting surface region around the optical axis, and a magnified cross sectional view of notches provided in the center end refracting surface region respectively. FIG. 6 is a diagram illustrating laser beams of each band of Configuration (2) being converged.

In FIGS. 5(a), (b), (c), and (d), objective lens 3 of Configuration (2) is a convex lens which comprises: an incoming end refracting surface 51 having a positive power of incoming laser beams L1 and L2 that are emitted by first light source 11 and second light source 12; and an outgoing end refracting surface 52 which emits the laser beams toward optical data storage medium 4.

Incoming refracting surface 51 is divided into two regions, a circular center refracting surface region 53 and outer circumferential refracting surface region 54 wherein region 53 which contains the optical axis L and a concentric circular region around the optical axis; and region 54 which circularly surrounds the outer circumference of center refracting surface region 53. The border between center end refracting surface region 53 and outer circumference refracting surface region 54 is at NA of 0.45-0.55 wherein NA is the numerical aperture of CD 41 (first laser beam L1).

Multiple microscopic concentric notches 50 are formed throughout center refracting surface region 53, thereby providing center end diffraction grating 55.

Center end refracting surface region 53 of objective lens 3 in Configuration (2) provides a refractive power that is different from that of outer circumferential refracting surface region 54. Center end diffraction grating 55, which is provided in center end refracting surface region 53, forms a spot of diffracted first laser beams L1 onto the recording surface of CD 41 that passed through the region 53. It also forms a spot of second laser beams L2 onto the recording surface of DVD 42 that passed through the region 53.

In this embodiment, both first laser beam L1 and second laser beams L2 utilizes the first order diffracted beams generated by center end diffraction grating 55.

In contrast, outer circumferential refracting surface region 54 in Configuration 2 of objective lens 3 provides a refractive power required for forming a spot of second laser beams L2 passing region 54. In other words, in outer circumferential refracting surface region 54, no notches with a narrow pitch are provided to form a diffraction grating. Therefore, a cast for use in molding objective lens 3 can be easily made. The absence of notches also improves transmittivity in outer circumferential refracting region 54 because no light is lost as it passes therethrough.

To reproduce data from CD 41 in optical head apparatus 1 having objective lens 3 of Configuration (2) described above, only first laser source 11 is actuated to emit first laser beams L1. Among light beam components of first laser beams L1 passing through center end refracting surface region 53 of objective lens 3, beam spots B41 of diffracted beam components generated by center end diffraction grating 55 are formed onto the recording surface of CD 41 as shown in dashed lines in FIG. 6. First beam L1 components passing through outer circumferential refracting surface region 54 of objective lens 3 are unwanted and do not condense onto the recording surface of CD 41 as beam spots.

In contrast, to reproduce data on DVD 42, only second laser source 12 is actuated to emit first laser beams L2. As shown in solid lines in FIG. 6 among light beam components of laser beams L2 that are passing through center end refracting surface region 53 of objective lens 3, diffracted components generated by center end diffraction grating 55 and components of laser beams L2 that passes through outer circumferential refracting surface region 54 of objective lens 3 incorporate each other to form beam a spot B42 on the recording surface of DVD 42.

In objective lens 3 used for optical head apparatus 1 of this embodiment illustrated in FIGS. 5(a), (b), (c), and (d), height (H) of notches 50 of center end diffraction grating 55 is set to meet the following equation:

$$h_2 < H < (h_1 + h_2)/2$$

wherein $h_1 = \lambda_1/(n_1 - 1)$
$h_2 = \lambda_2/(n_2 - 1)$ wherein H is the height of multiple notches of center end diffraction grating 55; $n_1$ is the refractive index of center end refracting surface region 53 where first laser beams L1 having a wavelength $\lambda_1$ enter; $n_2$ is the refractive index in center end refracting surface region 53 where second laser beams L2 having a wavelength $\lambda_2$ enter.

Now, assume that refractive index (n) ($n_1 = n_2 = n$) of center end refracting surface region 53 is 1.54; $\lambda_1$ for first laser beams L1 is 785 nm; $\lambda_2$ for second laser beams L2 is 655 nm, then, $h_1$ is 1.45 μm and $h_2$ is 1.21 μm. The height, H, of notches 50 of center end diffraction grating 55 is, therefore, set to meet the following equation:

$$1.21 \; \mu m < H \; (\mu m) < 1.33 \; \mu m$$

In this embodiment, height (H) of notches 50 of center end diffraction grating 55 is set to meet the following equation within the above range:

$$H = (S_1 \times h_2 + S_2 \times h_1)/(S_1 + S_2)$$

wherein $S_1$ is a pit area of recording surface 41a on CD 41 formed by first laser beams L1 onto; $s_2$ is a pit area on recording surface 42a on DVD 42 formed by second laser beams L2.

Herein, the minimum pit length (the width of a pit toward the track) formed onto recording surface 41a of CD 41 is about 0.8 μm; the minimum pit length (the width of a pit toward the track) formed onto recording surface 42a of DVD 42 is about 0.4 μm; the track pitch of CD 41 is 1.6 μm; the track pitch of DVD 42 is 0.74 μm. As a result, the ratio of pit area $S_1$ on recording surface 41a of CD 41 to pit area $S_2$ on recording surface 42a of DVD 42 is about 4:1.

For this reason, height (H) of notches 50 of center end diffraction grating 55 is set to 1.26 μm utilizing the following equation:

$$H=(4 \times h_2+1 \times h_1)/5.$$

The use of objective lens 3 having notches 50 described above formed on center end refracting surface region 53 produces an S-curve property that falls between the S-curve shown in FIG. 14(a) and that shown in FIG. 14(c) because the height (H) of notches 50 of center end diffraction grating 55 is set to a numerical value close to $h_2$ corresponding to second laser beams L2 than a mean between $h_1$ corresponding to first laser beams L1 and $h_2$ corresponding to second laser beams L2. The resulting S-curve shows excellent amplitude for both CD 41 and DVD 42. Objective lens 3 thus configured provides accurate focusing servo particularly for fingerprint disks of for DVD 42.

Additionally, in objective lens 3 thus configured, the height (H) of notches 50 is set by determining the degree of deviation toward $h_2$ that corresponds to second laser beams L2 and then adjusted by proper weight to reflect the complexity of data reproduction operation. DVD 42 thus obtains excellent frontwave aberrations and transmittivity. CD 41 also obtains frontwave (wavelength) aberrations within tolerance and (excellent) transmittivity. Consequently, both CD 41 and DVD 42 obtains excellent pick up properties.

Since the height (H) of notches 50 on center end diffraction grating 55 is set to a numerical value closer to $h_2$ corresponding to second laser beams L2 than a mean between $h_1$ and $h_2$, and since the height (H) of notches at the center temperature (at the center) corresponds to a value close to the wavelength of second laser beams L2, DVD 42 obtains excellent pick up properties even though temperature raises and the wavelength of second laser beams L2 increases to some extent.

In objective lens 3 used for optical head apparatus 1 of this embodiment illustrated in FIGS. 5(a), (b), (c), and (d), the height (H) of notches 50 of center end diffraction grating 55 is set to meet the following equation in the similar manner as Configuration 1:

$$h_2<H<(h_1+h_2)/2$$

wherein $h_1=\lambda_1/(n_1-1)$ $h_2=\lambda_2/(n_2-1)$ wherein H is a height of multiple notches of center end diffraction grating 55; $n_1$ is the refractive index of center end refracting surface region 53 where first laser beams L1 having a wavelength $\lambda_1$ enter; $n_2$ is the refractive index of center end refracting surface region 53 where second laser beams L2 having a wavelength $\lambda_2$ enter.

Now, assume that refractive index (n) ($n_1=n_2=n$) of center end refracting surface region 53 is 1.54; $\lambda_1$ of first laser beams L1 is 785 nm; $\lambda_2$ of second laser beams L$2_2$ is 655 nm, then, $h_1$ is 1.45 μm and $h_2$ is 1.21 μm. The height, H, of notches 50 of center end diffraction grating 55 is, therefore, set to meet the following equation:

$$1.21 \text{ μm}<H \text{ (μm)}<1.33 \text{ μm}$$

In this embodiment, height (H) of notches 50 of center end diffraction grating 55 is set to meet the following equation within the above range:

$$H=(\phi_1^2 \times h_2+\phi_2^2 \times h_1)/(\phi_1^2+\phi_2^2)$$

wherein $\phi_1$ is the diameter of a beam spot formed onto recording surface 41a of CD 41 by first laser beams L1; $\phi_2$ is the diameter of a beam spot formed onto recording surface 42a of DVD 42 by second laser beams.

Now, a diameter of a beam spot is expressed by (constant × wavelength/NA of a lens), therefore, the $\phi_1^2$ to $\phi_2^2$ ratio is about 2.6:1 wherein for example, the NA corresponding to first laser beams L1 is 0.45; numerical aperture corresponding to second laser beams L2 is 0.60; and the $\phi_1$ to $\phi_2$ ratio is 1.6:1.

Therefore, in this embodiment, the height (H) of notches 50 of center end diffraction grating 55 is 1.28 μm as expressed in the following equation:

$$H=(4 \times h_2+1 \times h_1)/3.6.$$

The use of objective lens 3 having notches 50 described above formed on center end refracting surface region 53 produces an S-curve property that falls between the S-curve shown in FIG. 14(a) and that shown in FIG. 14(c) because height (H) of notches 50 of center end diffraction grating 55 is set to a numerical value close to $h_2$ corresponding to second laser beams L2 than a mean between $h_1$ corresponding to first laser beams L1 and $h_2$ corresponding to second laser beams L2. The resulting S-curve shows excellent amplitude for both CD 41 and DVD 42, thereby providing excellent pick up properties thereof.

Additionally, in objective lens 3 thus configured, the height (H) for notches 50 is set by determining the degree of deviation toward $h_2$ corresponding to second laser beams L2, and then it is adjusted by proper weight to reflect the complexity of data reproduction operation. Both CD 41 and DVD 42 obtain excellent pick up properties.

Since height (H) of notches 50 of center end diffraction grating 55 is set to a numerical value close to $h_2$ corresponding to second laser beams L2 than a mean between $h_1$ corresponding to first laser beams L1 and $h_2$ corresponding to second laser beams L2, and since the height (H) of notches at the center temperature corresponds to a value close to the wavelength of second laser beams L2, DVD 42 obtains excellent pick up properties even though temperature raises and the wavelength of second laser beams L2 increases to some extent.

In objective lens 3 used for optical head apparatus 1 of this embodiment illustrated in FIGS. 5(a), (b), (c), and (d), the height (H) of notches 50 of center end diffraction grating 55 is set to meet the following equation in the similar manner as Configurations 1 and 2:

$$h_2<H<(h_1+h_2)/2$$

wherein $h_1=\lambda_1/(n_1-1)$ $h_2=\lambda_2/(n_2-1)$ wherein H is the height of multiple notches of center end diffraction grating 55; $n_1$ is the refractive index of center end refracting surface region 53 where first laser beams L1 having a wavelength $\lambda_1$ enter; $n_2$ is the refractive index of center end refracting surface region 53 where second laser beams L2 having a wavelength $\lambda_2$ enter.

Now, assume that refractive index (n) ($n_1=n_2=n$) of center end refracting surface region 53 is 1.54; $\lambda_1$ of first laser beams L1 is 785 nm; $\lambda_2$ of second laser beams L2$_2$ is 655 nm, then, $h_1$ is 1.45 μm and $h_2$ is 1.21 μm. The height, H, of notches 50 of center end diffraction grating 55 is, therefore, set to meet the following equation:

1.21 μm<$H$ (μm)<1.33 μm.

In this embodiment, the height (H) of notches 50 of center end diffraction grating 55 takes both configurations 1 and 2 into consideration and is set to meet the following equation within the above range:

$H=(k \times h_2+1 \times h_1)/(k+1)$ wherein k=2.6-4.0.

If k=3, the height (H) of notches 3 of center end diffraction grating 35 is set to 1.27 μm.

Objective lens 3 having notches 50 of the height (H) provided in center end refracting surface region 53 can also provide excellent amplitude in the S-curve for both CD 41 and DVD 42. Excellent pick up properties are thus obtained.

In objective lens 3 described above, a refractive power of outer circumferential refracting surface region 54 is set to form a spot of second laser beam components pass therethrough onto the recording surface of DVD 42. However, a diffraction grating may be formed in outer circumferential bending region 54 as well such that a spot of diffracted component of second laser beams L2 that are generated by the diffraction grating is formed onto the recording surface of DVD 42.

FIG. 7(a) is a plan view of Configuration (3) of objective lens 3 having a diffraction grating in outer end refracting surface region as well; FIG. 7(b) is a cross section thereof; FIGS. 7(c) and (d) each are magnified cross section of the part.

As illustrated in the above figures, objective lens 3 of this embodiment is a convex lens having surfaces that comprise: an incoming end refracting surface 31A having a positive power of laser beams L1 and L2 that are emitted by first light source 11 and second light source 12 respectively; and an outgoing end refracting surface 32A which emits the laser beams toward optical data storage medium 4.

Incoming refracting surface 31A is divided into two regions, a circular center end refracting surface region 33A and outer circumferential refracting surface region 34A, wherein region 33A contains the optical axis L and a concentric circular region around the optical axis L and region 34 circularly surrounds the outer circumference of center refracting surface region 33A. In addition, center end diffraction grating 35A made with concentric microscopic notches 30A are formed throughout the region 33A. Further, outer circumferential diffraction grating 36A constructed with concentric microscopic notches 30A are formed throughout the region 34A.

In objective lens 3 of this embodiment, among first laser beams L1 emitted during data reproduction of CD 41, the components that pass through center end refracting surface region 33A form spots on recording surface of CD 41. More specifically, among the beam components, diffracted component generated by center end diffraction grating 35A provided in center end refracting surface region 33A forms a beam spot B41 on the recording surface of CD 41.

Hence, among first laser beams L1, the component which passes through outer circumferential refracting surface region 34A is an unwanted component because it does not contribute to data reproduction. Therefore, they are diffracted by outer circumferential diffraction grating 36 provided in outer circumferential refracting surface region 34A such that they do not condense at the spot forming position on recording surface of CD 41 in this embodiment.

Objective lens 3 of this embodiment forms a spot of second laser beams L2 emitted during data reproduction of DVD 42 onto recording surface 42a of DVD 42. In other words, among components of second laser beams L2 that pass through center end refracting surface region 33A, the diffracted beam component generated by center end diffraction grating 35A in center end refracting surface region 33A forms a spot of beams on recording surface (42a) of DVD 42. At the same time, among the components of the beams that pass through outer circumferential refracting surface region 34A, the diffracted beam component generated by outer circumferential diffraction grating 36A in outer circumferential refracting surface region 34A forms a spot of beams on the same position on recording surface (42a) of DVD 42.

In this embodiment, diffracted first laser beams L1 of the first order or diffracted second laser beams L2 of the first order are used for recording or reproduction of data on both CD 41 and DVD 42.

In objective lens 3 of configuration (3) described above, the height (H) of notches 30 of center end diffraction grating 35A is set, for example, to 1.28 μm.

Also in objective lens 3 of configuration (3), outer circumferential diffraction grating 36A is provided in outer circumferential refracting surface region 34A as well. The height of channel 30A of outer circumferential diffraction grating 36A is given the same height (H) as that of center end refracting surface region 33A, which is 1.28 μm, for example, such that unwanted beam component in the outer circumferential part of first laser beams L1 does not condense at the points on the recording surface of CD 41 where a spot of beams is formed. This helps matching the phase between the center end and outer circumference for second laser beams L2. Excellent frontwave aberrations are thus obtained, improving transmittivity. This configuration provides much better data reproduction performance than the configuration in which beam components that pass through the outer circumference are not diffracted.

Figure 9:
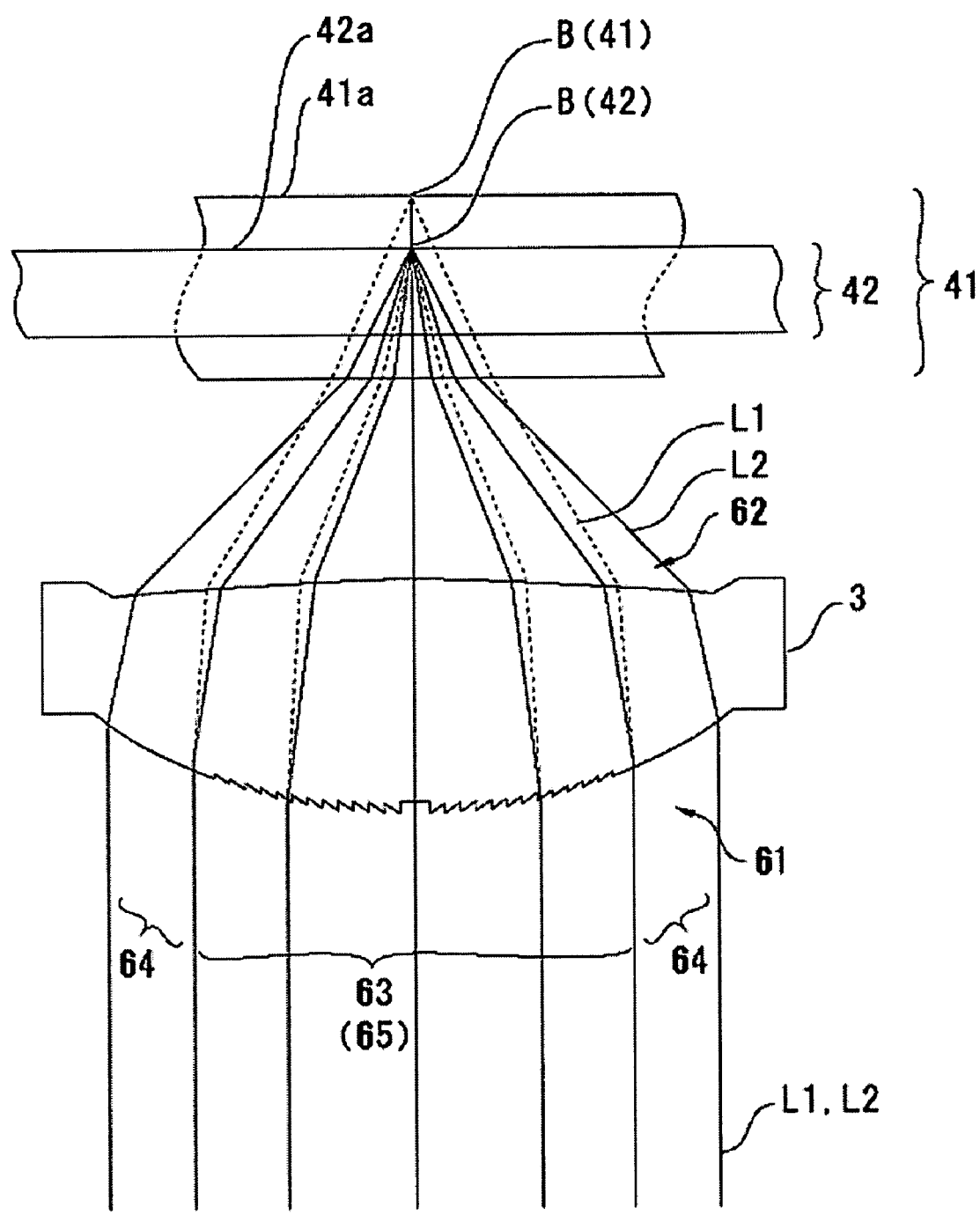
FIG. 9 is a diagram illustrating laser beams converged by objective lens (3).
Figure 12:
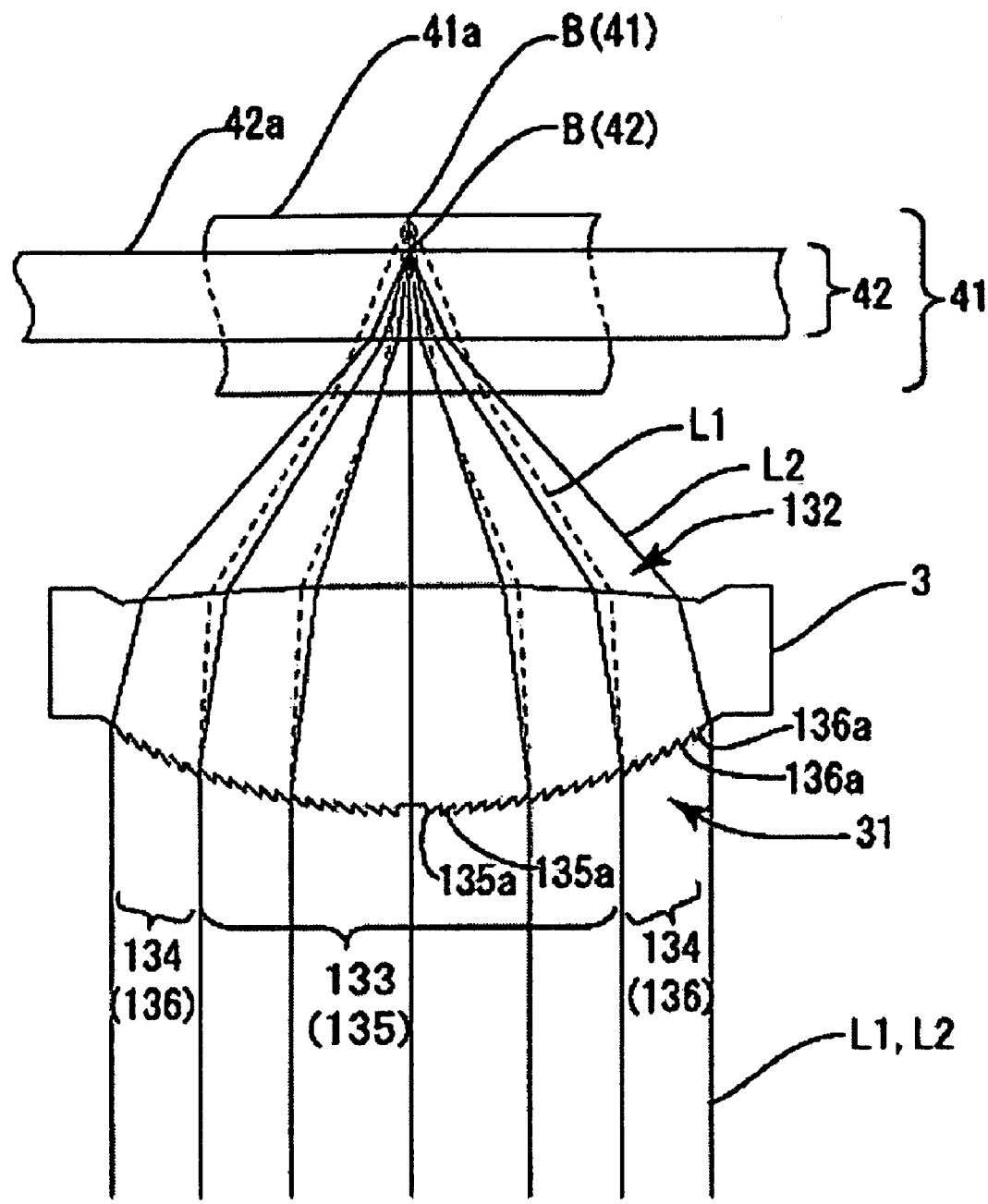
FIG. 12 is a diagram illustrating first laser beams and second laser beams converging on the object lens of conventional technology.
Figure 13:
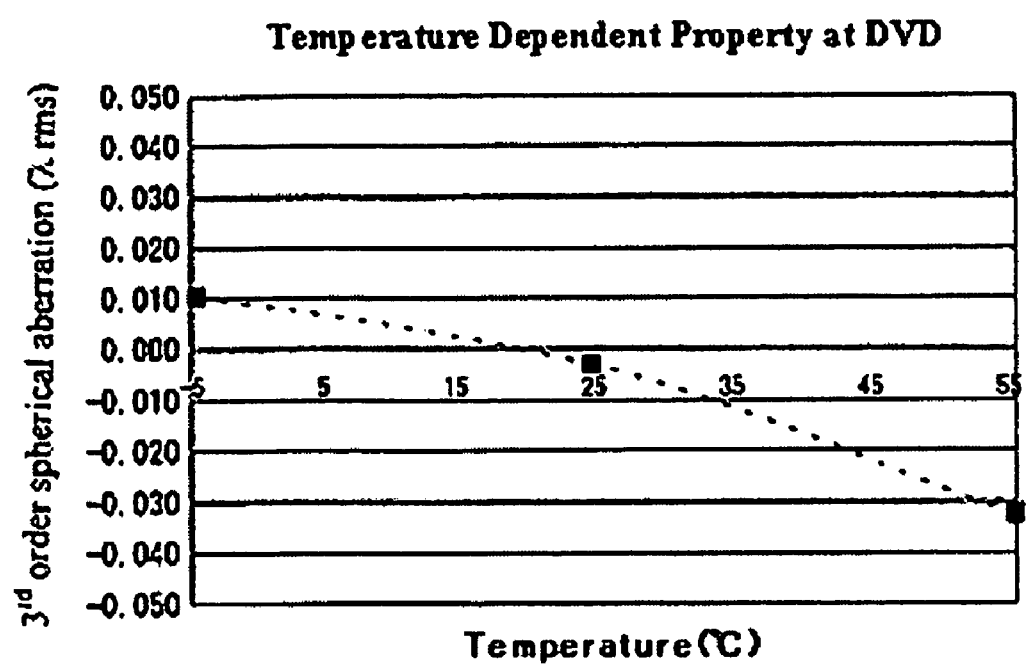
FIG. 13 is a graph plotting data points obtained by simulating the $3^{rd}$ order spherical aberrations that occurred on DVD using an objective lens of conventional technology.

Configuration (4) of objective lens 3 is described in detail herein with reference to FIGS. 8 and 9. FIGS. 8(a), (b), (c), and (d) each are a plan view, a cross sectional view, a magnified cross sectional view of the inner circumferential refracting surface region of the refracting surface at the incoming end, and a magnified cross sectional view of the refracting surface at the outgoing end. FIG. 9 is a diagram illustrating laser beams converged by objective lens 3.

In FIGS. 8(a), (b), (c), and (d), objective lens 3 of Configuration (4) is a convex lens which comprises: an incoming end refracting surface 61 having a positive power of laser beams L1 and L2 that are emitted from first light source 11 and second light source 12; and an outgoing end refracting surface 62 which emits the laser beams toward optical data storage medium 4. Both incoming end refracting surface 61 and outgoing end refracting surface 62 have a given aspheric surface.

Incoming refracting surface 61 is divided into two regions, a circular center refracting surface region 63 and outer circumferential refracting surface region 64 wherein region 63 contains the optical axis L and a concentric circular region around the optical axis L and region 64 circularly surrounds the outer circumference of center refracting surface region 63. The border between center end refracting surface region 63 and outer circumference refracting surface region 64 is at NA of 0.45-0.55.

Multiple microscopic concentric notches 60 are formed throughout center refracting surface region 63, thereby providing center end diffraction grating 65.

Center end refracting surface region 63 of objective lens 3 provides a refractive power that is different from that outer circumferential refracting surface region 64 provides. Center end diffraction grating 65, which is provided in center end refracting surface region 63, forms a spot of diffracted first laser beams L1 diffracted through the region 63 onto the recording surface of CD 41. It also forms a spot of second laser beams L2 onto the recording surface of DVD 42 after second beams L2 are diffracted as they pass through the region 63.

In this embodiment, both first laser beam L1 and second laser beams L2 utilize the first order diffracted beams generated by inner circumferential diffraction grating 65.

In contrast, outer circumferential refracting surface region 64 of objective lens 3 provides a refracting power required for forming a spot of second laser beams L2 passing region 64. In other words, in outer circumferential refracting surface region 64, no notches with a narrow pitch are provided to form a diffraction grating. Therefore, a cast for use in molding objective lens 3 can be easily made. The absence of notches also improves transmittivity in outer circumferential bending region 64 because no light is lost as it passes therethrough.

To reproduce data from CD 41 in optical head apparatus 1 having objective lens 3 of Configuration (4) described above, only first laser source 11 is actuated to emit first laser beams L1. Among light beam components of first laser beams L1 passing through inner circumferential refracting surface region 63 of objective lens 3, beam spots B41 of the diffracted beam component generated by center end diffraction grating 55 is formed onto the recording surface of CD 41 as shown in dotted lines in FIG. 9. The component of first beams L1 that passes through outer circumferential refracting surface region 64 of objective lens 3 is unwanted and do not condense onto the recording surface of CD 41 in a spot.

In contrast, to reproduce data on DVD 42, only second laser source 12 is actuated to emit second laser beams L2. As shown in solid lines in FIG. 9, among light beam components of laser beams L2 that pass through center end refracting surface region 63 of objective lens 3, the diffracted component generated by inner circumferential diffraction grating 65 and the component of laser beams L2 that pass through outer circumferential refracting surface region 64 of objective lens 3 incorporate each other to form a spot of beams B42 onto the recording surface of DVD 42.

In objective lens 3, the NA defined by outer circumferential refracting surface region 64 is set to 0.6 which corresponds to NA of DVD 42 and meets the following equation:

$$0.55 \leq NA \leq 0.65$$

The focal length at the center of optical axis of said objective lens (L2) for second laser beams for DVD meets the following equation:

$$d/f \geq 0.665.$$

wherein (d) is a lens thickness and (f) is a focal length.

Therefore, the parallel eccentricity between incoming end refracting surface 61 and outgoing end refracting surface 62 or the degree of inclination of objective lens 3 tend to greatly influence optical pick up properties.

To solve the problem, an angle θ of aspheric surface of objective lens 3 in the region where NA≧0.5 on outgoing end refracting surface 62 is set to 0°≦θ≦10° in this embodiment as illustrated in FIG. 8(d). Herein, the angle θ of (at a given point on) aspheric surface is defined by the optical axis and a normal line on the lens surface at a given point away from the optical axis. The given point, in this embodiment, is a point in the region where NA≧0.5, which is effective for data reproduction of DVD 42.

In objective lens 3 thus configured, aspheric shapes of incoming end refracting surface 61 and outgoing end refracting surface 62 are optimized based on the wavelength of each laser beams L1 and L2. However, aberrations do not increase even though the center of the incoming end refracting surface 61 and outgoing end refracting surface 62 deviate to some degree. Excellent focusing is thus obtained on recording surfaces 41a and 42a on optical data storage medium 4.

For example, the relationship between parallel eccentricities that occur between incoming end refracting surface 61 and outgoing end refracting surface 62 with third order spherical aberration, coma aberration, aspheric aberration, and wavefront aberration was studied for objective lens 3 of configuration (4). FIG. 10(a) shows the relationship between eccentricity and the third order spherical aberration (solid line L1), coma aberration (dashed lines L2), aspheric aberration (one-dot broken line L3), and wavefront aberration (two-dot broken line L4). An increase in amount of parallel eccentricity increases does not affect coma aberration and wavefront aberration. This allows a metallic cast to have less stringent accuracy required to (press) mold objective lens 3.

Further even though the amount of tilting of objective lens 3 is changed by tilting control or the like, it can focus excellently on recording surfaces 41a and 42a on optical data storage medium 4.

Also the relationship between tilting of objective lens 3 of Configuration (4) and the third order spherical aberration (solid line L1), coma aberration (dashed lines L2), aspheric aberration (one-dot broken line L3), and wavefront aberration (two-dot broken line L4), coma aberration and wavefront aberrations do not deteriorate (even though tilting of objective lens 3 increases), which is apparent from FIG. 10(b).

In objective lens 3 described above, a refractive power of outer circumferential refracting surface region 64 is set to form a spot of second laser beam components passing through the region 64 onto the recording surface of DVD 42. However, a diffraction grating may be formed in outer circumferential bending region 64 in the similar manner as shown in FIG. 7 such that a spot of the diffracted component of second laser beams L2 generated by the diffraction grating is formed onto the recording surface of DVD 42.

In objective lens 3, numerical apertures (NA) defined by outer circumferential refracting surface region 63 is set to 0.6 which corresponds to that of DVD 42 and meets the following equation:

$$0.55 \leq NA \leq 0.65$$

The focal length for the second laser beams (L2) for DVD meets the following equation:

$$d/f \geq 0.665$$

wherein (d) is a lens thickness and (f) is a focal length. In this configuration, the parallel eccentricity between incoming end refracting surface 61 and outgoing end refracting surface 62 or the degree of inclination of objective lens 3 tend to greatly influence optical pick up properties.

Therefore, in this embodiment also, an angle θ of aspheric surface of objective lens 3 in the region is set to 0°≦θ≦10° where NA≧0.5 on outgoing end refracting surface 62 as illustrated in FIG. 8(*d*). Objective lens 3 thus configured excellently focuses on recording surfaces 41*a* and 42*a* on optical data storage media even though the center of the incoming end refracting surface 61 and outgoing end refracting surface 62 deviate to some degree and objective lens 3 is tilted to have different inclination.

Besides objective lens 3, the present invention is applicable to collimate lens 23, for example, which laser beams having different wavelengths passes therethrough in optical head apparatus 1.

As described above, in the optical head apparatus utilizing a lens of the present invention as an objective lens, the inner circumferential diffraction grating and at least a part of the outer circumferential diffraction grating emit diffracted beams of an order with different polarities. As a result, even though a change in temperature causes a change in refractive index or linear expansion in the lens material, or a change in temperature causes a change in wavelength of laser beams, spherical aberrations derived from such a change in temperature are complemented by the inner and the outer diffraction gratings. If the objective lens of this present invention is applied to an optical head apparatus and utilized as a common objective lens, the influence of a change in surrounding temperature is suppressed by the inner and outer circumferential diffraction gratings during recording and reproduction of data on an optical data storage medium. Hence, excellent pick up properties are obtained.

Another invention pays attentions to the fact that the second optical data storage medium and the second laser beams are used for high density data storage and the height of notches of center end diffraction grating is set to a numerical value close to the height required for accommodating second laser beams than a mean between the height corresponding to first laser beams and the height corresponding to second laser beams. In other words, the height of notches is set utilizing (a numerical value) corresponding to the complexities of data reproduction operation obtained by weighted average with reference to the pit size and the beam spot size. The amplitude in the S-curve for second optical data storage medium thus obtained is large enough to provide servo focusing on a fingerprint disk. This invention also provides servo focusing on a dual layer disk and provides excellent pick up properties for both first and second optical data storage media. Additionally, the fact that the height of notches of center end diffraction grating is set to a value close to the numerical value (which helps absorb) an increase in wavelength of second laser beams if a change in temperature increases wavelength of second laser beams to some extent. Excellent pick up properties are thus obtained for the second optical data storage medium.

Further according to another invention, between incoming end refracting surface and outgoing end refracting surface, the shape of the refracting surface (region where NA≧0.5) without a diffraction grating is defined by aspheric surface inclination of 0°≦10°. As a result, even though inclination of the objective lens is changed by tilting and the like, it can focus excellently on recording surfaces of optical data storage media.

The foregoing specific embodiments represent just some of the ways of practicing the present invention. Many other embodiments are possible within the spirit of the invention. Accordingly, the scope of the invention is not limited to the foregoing specification, but instead is given by the appended claims along with their full range of equivalents.

What is claimed is:

1. An optical head apparatus having a common objective lens through which first laser beams emitted from a first laser beam source are condensed onto the recording surface of a first optical data storage medium, and second laser beams of a wavelengths shorter than said first laser beams that are emitted from a second laser beam source are condensed onto the recording surface of a second optical data storage medium being covered by a transparent protective layer which is thinner than said first optical data storage medium;

wherein said refracting surface of said objective lens is divided into a center end refracting surface region around the optical axis thereof and an outer circumferential refracting surface region surrounding the outside of said center end refracting surface region; multiple microscopic concentric notches are provided throughout said center end refracting surface region, thereby providing a center end diffraction grating;

for reproduction of data on said first optical data storage medium utilizing said first laser beam source are selected diffracted beams obtained via said center end refracting surface region; for reproduction of data on said second optical data storage medium utilizing said second laser source are selected beams that passed through said outer circumferential refracting surface region and diffracted beams obtained via said center end refracting surface region;

where the height H of said notches of said center end diffraction grating is expressed by the following equation:

$$h_2 < H < (h_1+h_2)/2$$

wherein $$h_1 = \lambda_1/(n_1-1)$$

$$h_2 = \lambda_2/(n_2-1)$$

wherein H is the height of said notches of said center end diffraction grating; $n_1$ is the refractive index at said center end refracting surface region for said first laser beams of a wavelength $\lambda_1$ that come therein; $n_2$ is the refractive index at said center end refracting surface region for said second laser beams of a wavelength $\lambda_2$ that come therein.

2. The optical head apparatus as set forth in claim 1 wherein the height H of said notches on said center end diffraction grating is set to meet the following equation:

$$H = (S_1 \times h_2 + S_2 \times h_1)/(S_1+S_2)$$

wherein $S_1$ is a pit area on the recording surface of said first optical data storage medium to be recorded or reproduced by said first laser beams; $S_2$ is a pit area on the recording surface of said second optical data storage medium to be recorded or reproduced by said second laser beams.

3. The optical head apparatus as set forth in claim 1 wherein the height H of said notches on said center end diffraction grating is set to meet the following equation:

$$H = (\phi_1^2 \times h_2 + \phi_2^2 \times h_1)/(\phi_1^2+\phi_2^2)$$

wherein $\phi_1$ is the diameter of a beam spot formed on the recording surface of said first optical data storage medium by first laser beams; $\phi_2$ is the diameter of a beam spot formed on the recording surface of said second optical data storage medium by second laser beams; and H is the height of said center end diffraction grating.

4. The optical head apparatus as set forth in claim 1 wherein the height H of said notches of said center end diffraction grating is set to meet the following equation:

$$H=(k \times h_2 + 1 \times h_1)/(k+1)$$

where k=2.6-4.0.

5. The optical head apparatus as set forth in claim 1 wherein said outer circumferential refracting surface region provides a refracting power that is suitable for said second laser beams to form said second beam spots on the recording surface of said second optical data storage medium.

6. The optical head apparatus as set forth in claim 1 wherein an outer circumferential diffraction grating is made up with multiple microscopic concentric notches formed throughout said outer circumferential refracting surface region;

for recording and reproducing data on said second optical data storage medium utilizing said second laser beam source are selected diffracted beams obtained via said center end refracting surface region and diffracted beams obtained via said outer circumferential refracting surface region;

the height H of said notches constituting said outer circumferential diffraction grating is set to be the same as the height of notch of said center end diffraction grating.

7. An objective lens for an optical head apparatus having a refracting surface wherein said refracting surface is divided into a center end refracting surface region around the optical axis thereof and an outer circumferential refracting surface region surrounding the outside of said center end refracting surface region; multiple microscopic concentric notches are provided throughout said center end refracting surface region, thereby providing a center end diffraction grating;

wherein the height H of said notches of said center end diffraction grating is expressed by the following equation:

$$h_2 < H < (h_1 + h_2)/2$$

wherein $$h_1 = \lambda_1/(n_1 - 1)$$

$$h_2 = \lambda_2/(n_2 - 1)$$

wherein H is a height of said notches of said center end diffraction grating; $n_1$ is the refractive index on said center end refracting surface region for said first laser beams of a wavelength $\lambda_1$ that come therein; $n_2$ is the refractive index on said center end refracting surface region for said second laser beams of a wavelength $\lambda_2$ that come therein;

for reproduction of data on said first optical data storage medium utilizing said first laser beam source are selected diffracted beams obtained via said center end refracting surface region; for reproduction of data on said second optical data storage medium utilizing said second laser beam source are selected beams that passed through said outer circumferential refracting surface region and diffracted beams obtained via said center end refracting surface region.

8. The objective lens for the optical head apparatus as set forth in claim 7 wherein the height H of said notches on said center end diffraction grating is set to meet the following equation:

$$H=(S_1 \times h_2 + S_2 \times h_1)/(S_1 + S_2)$$

wherein $S_1$ is a pit area on the recording surface of said first optical data storage medium to be recorded or reproduced by said first laser beams; $S_2$ is a pit area on the recording surface of said second optical data storage medium to be recorded or reproduced by second laser beams.

9. The objective lens for the optical head apparatus as set forth in claim 7 wherein the height H of said notches on said center end diffraction grating is set to meet the following equation:

$$H=(\phi_1^2 \times h_2 + \phi_2^2 \times h_1)/(\phi_1^2 + \phi_2^2)$$

wherein $\phi_1$ is the diameter of a beam spot formed on the recording surface of said first optical data storage medium by first laser beams; $\phi_2$ is the diameter of a beam spot formed on the recording surface of said second optical data storage medium by second laser beams; and H is the height of said center end diffraction grating.

10. The objective lens for the optical head apparatus as set forth in claim 7 wherein the height H of said notches of said center end diffraction grating is set to meet the following equation:

$$H=(k \times h_2 + 1 \times h_1)/(k+1)$$

where k=2.6-4.0.

11. The objective lens for the optical head apparatus as set forth in claim 7 wherein said outer circumferential refracting surface region provides a refracting power that is suitable for said second laser beams to form said second beam spots on the recording surface of said second optical data storage medium.

12. The objective lens for the optical head apparatus as set forth in claim 7 wherein an outer circumferential diffraction grating has multiple microscopic concentric notches formed throughout said outer circumferential refracting surface region;

for recording and reproducing data on said second optical data storage medium utilizing said second laser beam source are selected diffracted beams obtained via said center end refracting surface region and diffracted beams obtained via said outer circumferential refracting surface region;

the height H of said notches constituting said outer circumferential diffraction grating is set to be the same as the height of notch of said center end diffraction grating.

* * * * *